United States Patent
Braunreiter et al.

(10) Patent No.: US 11,513,227 B2
(45) Date of Patent: Nov. 29, 2022

(54) ATMOSPHERIC JITTER CORRECTION AND TARGET TRACKING USING SINGLE IMAGING SENSOR IN HIGH-ENERGY LASER SYSTEMS

(71) Applicant: Raytheon Company, Waltham, MA (US)

(72) Inventors: Dennis C. Braunreiter, San Diego, CA (US); Aaron S. Stonely, McKinney, TX (US); Daniel T. Young, Allen, TX (US)

(73) Assignee: Raytheon Company, Waltham, MA (US)

( * ) Notice: Subject to any disclaimer, the term of this patent is extended or adjusted under 35 U.S.C. 154(b) by 64 days.

(21) Appl. No.: 16/674,995

(22) Filed: Nov. 5, 2019

(65) Prior Publication Data

US 2021/0103056 A1    Apr. 8, 2021

Related U.S. Application Data

(63) Continuation-in-part of application No. 16/596,595, filed on Oct. 8, 2019.

(51) Int. Cl.
    *G01S 17/58*    (2006.01)
    *G01S 7/481*    (2006.01)
    (Continued)

(52) U.S. Cl.
    CPC ............ *G01S 17/58* (2013.01); *G01S 7/4817* (2013.01); *G01S 17/32* (2013.01); *G06T 7/20* (2013.01);
    (Continued)

(58) Field of Classification Search
    CPC ........ G01S 17/58; G01S 7/4817; G01S 17/32; G06T 7/20; H04N 5/2256; H04N 5/23232
    See application file for complete search history.

(56) References Cited

U.S. PATENT DOCUMENTS 5,557,347 A    9/1996  Johnson
5,780,839 A    7/1998  Livingston
(Continued)

FOREIGN PATENT DOCUMENTS

EP    2793191 A2    10/2014
JP    3041283 B2    5/2000
JP    2002051347 A  *  2/2002

OTHER PUBLICATIONS

Rigorous approach to bore-sight self-calibration in airborne laser scanning; Skaloud et al.; Sep. 7, 2006; www.sciencedirect.com; retrieved Nov. 14, 2021 (Year: 2006).*

(Continued)

*Primary Examiner* — Jonathan R Messmore

(57) ABSTRACT

A system includes a target illumination laser (TIL) configured to generate a TIL beam that illuminates a target and a beacon illumination laser (BIL) configured to generate a BIL beam that creates a spot on the target. The system also includes an imaging sensor configured to capture both (i) first images of the target containing reflected TIL energy from the TIL beam without reflected BIL energy from the BIL beam and (ii) second images of the target containing reflected TIL energy from the TIL beam and reflected BIL energy from the BIL beam. The system further includes at least one controller configured to perform target tracking using the first images and boresight error compensation using the second images.

20 Claims, 7 Drawing Sheets

(51) Int. Cl.
  *G01S 17/32* (2020.01)
  *G06T 7/20* (2017.01)
  *H04N 5/225* (2006.01)
  *H04N 5/232* (2006.01)

(52) U.S. Cl.
  CPC ....... *H04N 5/2256* (2013.01); *H04N 5/23232* (2013.01)

(56) References Cited

U.S. PATENT DOCUMENTS

| | | | |
|---|---|---|---|
| 5,936,229 | A | 8/1999 | Livingston |
| 6,115,123 | A * | 9/2000 | Stappaerts ............... G03H 1/08 356/121 |
| 7,041,953 | B2 | 5/2006 | Byren |
| 8,049,870 | B2 | 11/2011 | Mosier et al. |
| 8,218,589 | B1 | 7/2012 | Saunders |
| 8,415,600 | B2 | 4/2013 | Hutchin |
| 8,853,604 | B1 * | 10/2014 | Barchers ............... G01S 7/4814 250/201.9 |
| 9,368,936 | B1 | 6/2016 | Lenius et al. |
| 10,565,684 | B2 | 2/2020 | Zhang et al. |
| 10,798,298 | B1 * | 10/2020 | Tarifa ................... H04N 5/2357 |
| 11,017,560 | B1 | 5/2021 | Gafni et al. |
| 2006/0022115 | A1 | 2/2006 | Byren |
| 2006/0126952 | A1 | 6/2006 | Suzuki et al. |
| 2007/0217705 | A1 | 9/2007 | Lee et al. |
| 2009/0092337 | A1 | 4/2009 | Nagumo |
| 2012/0268309 | A1 * | 10/2012 | Samuel ................. F41G 7/2246 342/62 |
| 2013/0010100 | A1 | 1/2013 | Kotaki et al. |
| 2016/0086018 | A1 | 3/2016 | Lemoff |
| 2016/0184924 | A1 * | 6/2016 | Kalender ............ F41H 13/0062 250/201.1 |
| 2016/0247262 | A1 | 8/2016 | Li et al. |
| 2016/0295208 | A1 | 10/2016 | Beall |
| 2017/0192094 | A1 | 7/2017 | Marron et al. |
| 2017/0261743 | A1 | 9/2017 | Kim et al. |
| 2018/0307815 | A1 * | 10/2018 | Samadani ............... G06F 21/32 |
| 2021/0156969 | A1 | 5/2021 | Levy et al. |

OTHER PUBLICATIONS

International Search Report dated Apr. 1, 2021 in connection with International Patent Application No. PCT/US2020/040571, 3 pages.
Written Opinion of the International Searching Authority dated Apr. 1, 2021 in connection with International Patent Application No. PCT/US2020/040571, 7 pages.
International Search Report dated Mar. 19, 2021 in connection with International Patent Application No. PCT/US2020/036675, 3 pages.
Written Opinion of the International Searching Authority dated Mar. 19, 2021 in connection with International Patent Application No. PCT/US2020/036675, 8 pages.
Braunreiter et al., U.S. Appl. No. 16/702,279 entitled "Super-Resolution Automatic Target Aimpoint Recognition and Tracking" filed on Dec. 3, 2019, 51 pages.
Higgs et al., "Atmospheric Compensation and Tracking Using Active Illumination," Lincoln Laboratory Journal, vol. 11, Nov. 1998, 22 pages.
Chen et al., "Advanced image registration techniques and applications," Proceedings of SPIE, SPIE Defense and Security Symposium, Apr. 2008, 15 pages.
Chen et al., "Advanced super-resolution image enhancement process," Proceedings of SPIE, Optical Engineering + Applications, Sep. 2008, 11 pages.
Braunreiter et al., U.S. Appl. No. 16/559,136 entitled "System and Method for Correcting for Atmospheric Jitter and High Energy Laser Broadband Interference Using Fast Steering Mirrors" filed on Sep. 3, 2019, 29 pages.
Braunreiter et al., U.S. Appl. No. 16/596,595 entitled "System and Method for Predictive Compensation of Uplink Laser Beam Atmospheric Jitter for High Energy Laser Weapon Systems" filed on Oct. 8, 2019, 27 pages.
International Search Report and Written Opinion of the International Searching Authority in connection with International Patent Application No. PCT/US2020/029619 dated Jul. 10, 2020, 8 pages.
International Search Report and Written Opinion of the International Searching Authority in connection with International Patent Application No. PCT/US2020/033176 dated Jul. 15, 2020, 10 pages.
Office Action dated Aug. 6, 2021 in connection with U.S. Appl. No. 16/596,595, 32 pages.
Office Action dated Aug. 18, 2021 in connection with U.S. Appl. No. 16/702,279, 32 pages.
Applicant-Initiated Interview Summary dated Feb. 15, 222 in connection with U.S. Appl. No. 16/702,279, 3 pages.
Office Action dated Dec. 7, 2021 in connection with U.S. Appl. No. 16/596,595, 37 pages.
Office Action dated Jan. 19, 2022 in connection with U.S. Appl. No. 16/702,279, 23 pages.

* cited by examiner

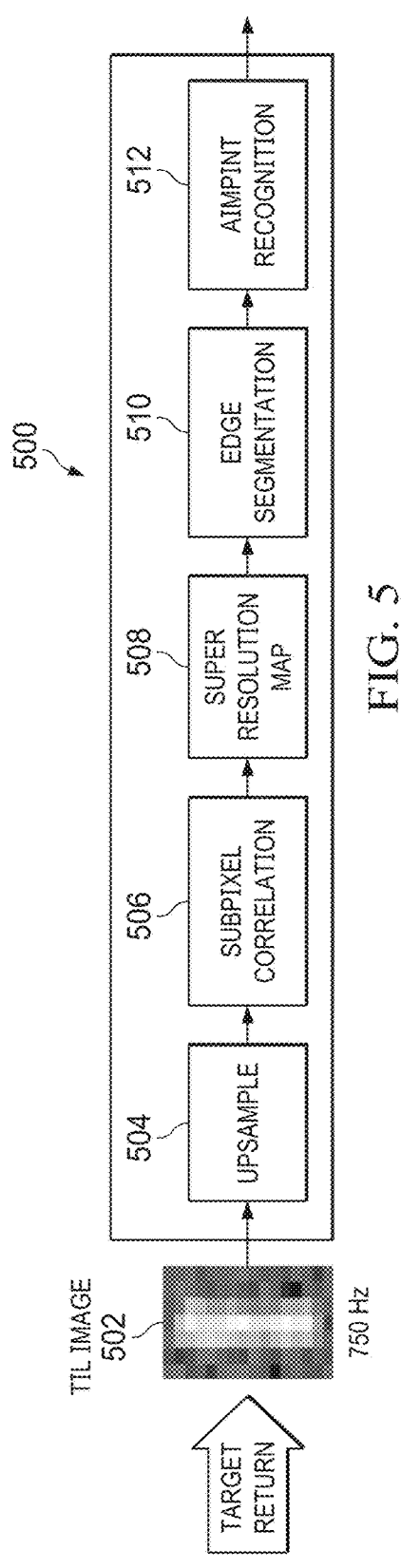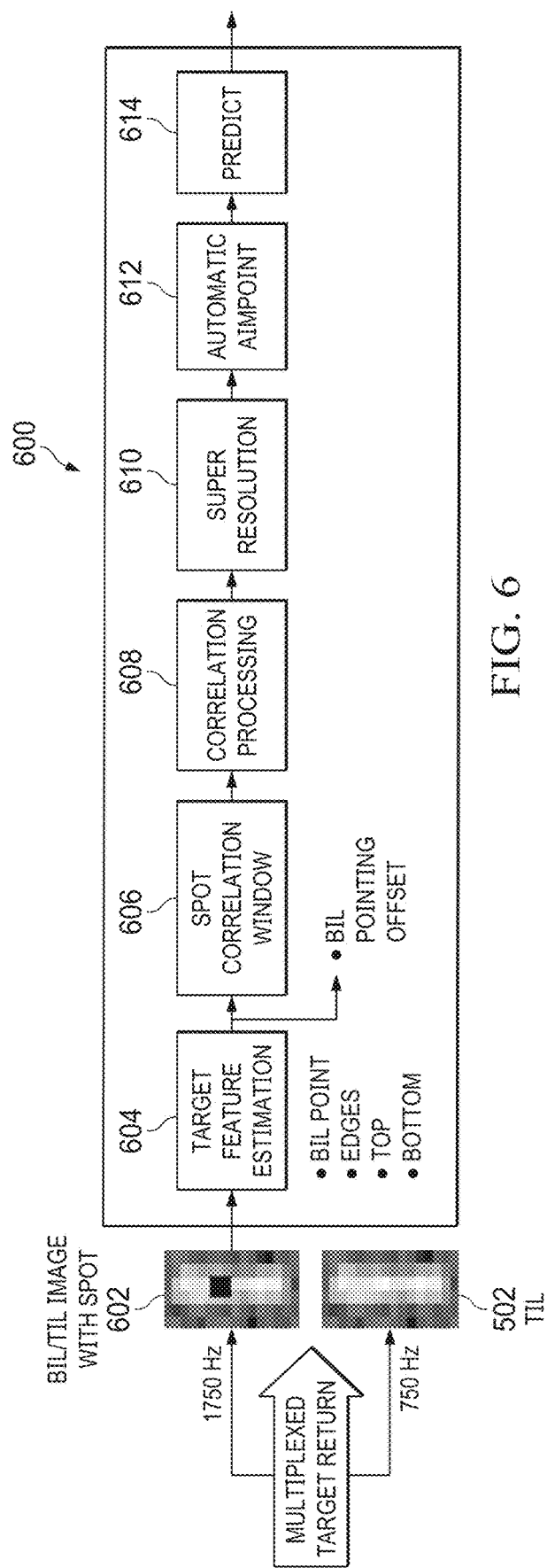

ATMOSPHERIC JITTER CORRECTION AND TARGET TRACKING USING SINGLE IMAGING SENSOR IN HIGH-ENERGY LASER SYSTEMS

CROSS-REFERENCE TO RELATED APPLICATION AND PRIORITY CLAIM

This application claims priority as a continuation-in-part of U.S. patent application Ser. No. 16/596,595 filed on Oct. 8, 2019, which is hereby incorporated by reference in its entirety.

GOVERNMENT RIGHTS

This invention was made with U.S. government support under contract number W9113M-17-D-0006-0002 awarded by the Department of Defense. The U.S. government may have certain rights in this invention.

TECHNICAL FIELD

This disclosure is generally directed to high-energy laser systems. More specifically, this disclosure is directed to atmospheric jitter correction and target tracking using a single imaging sensor in high-energy laser systems.

BACKGROUND

High-energy laser (HEL) systems are being developed for a number of commercial and defense-related applications. For example, high-energy lasers may be used to direct high-energy beams at incoming missiles, rockets, mortars, or other targets. Unfortunately, various factors can degrade a high-energy laser beam, which reduces the focused power of the beam on a desired target. This can increase the amount of time needed to achieve a desired result, such as damage or destruction of the target, or can prevent the desired result from being achieved.

SUMMARY

This disclosure relates to atmospheric jitter correction and target tracking using a single imaging sensor in high-energy laser systems.

In a first embodiment, a system includes a target illumination laser (TIL) configured to generate a TIL beam that illuminates a target and a beacon illumination laser (BIL) configured to generate a BIL beam that creates a spot on the target. The system also includes an imaging sensor configured to capture both (i) first images of the target containing reflected TIL energy from the TIL beam without reflected BIL energy from the BIL beam and (ii) second images of the target containing reflected TIL energy from the TIL beam and reflected BIL energy from the BIL beam. The system further includes at least one controller configured to perform target tracking using the first images and boresight error compensation using the second images.

In a second embodiment, at least one non-transitory computer readable medium contains instructions that when executed cause at least one processor to control a TIL to generate a TIL beam that illuminates a target and control a BIL to generate a BIL beam that creates a spot on the target. The at least one medium also contains instructions that when executed cause the at least one processor to control an imaging sensor to capture both (i) first images of the target containing reflected TIL energy from the TIL beam without reflected BIL energy from the BIL beam and (ii) second images of the target containing reflected TIL energy from the TIL beam and reflected BIL energy from the BIL beam. The at least one medium further contains instructions that when executed cause the at least one processor to perform target tracking using the first images and boresight error compensation using the second images.

In a third embodiment, a method includes illuminating a target using a TIL beam and creating a spot on the target using a BIL beam. The method also includes, using an imaging sensor, capturing both (i) first images of the target containing reflected TIL energy from the TIL beam without reflected BIL energy from the BIL beam and (ii) second images of the target containing reflected TIL energy from the TIL beam and reflected BIL energy from the BIL beam. The method further includes performing target tracking using the first images and boresight error compensation using the second images.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4 through 8 illustrate an example control system supporting atmospheric jitter correction and target tracking using a single imaging sensor for a high-energy laser according to this disclosure.

DETAILED DESCRIPTION

Figure 1:
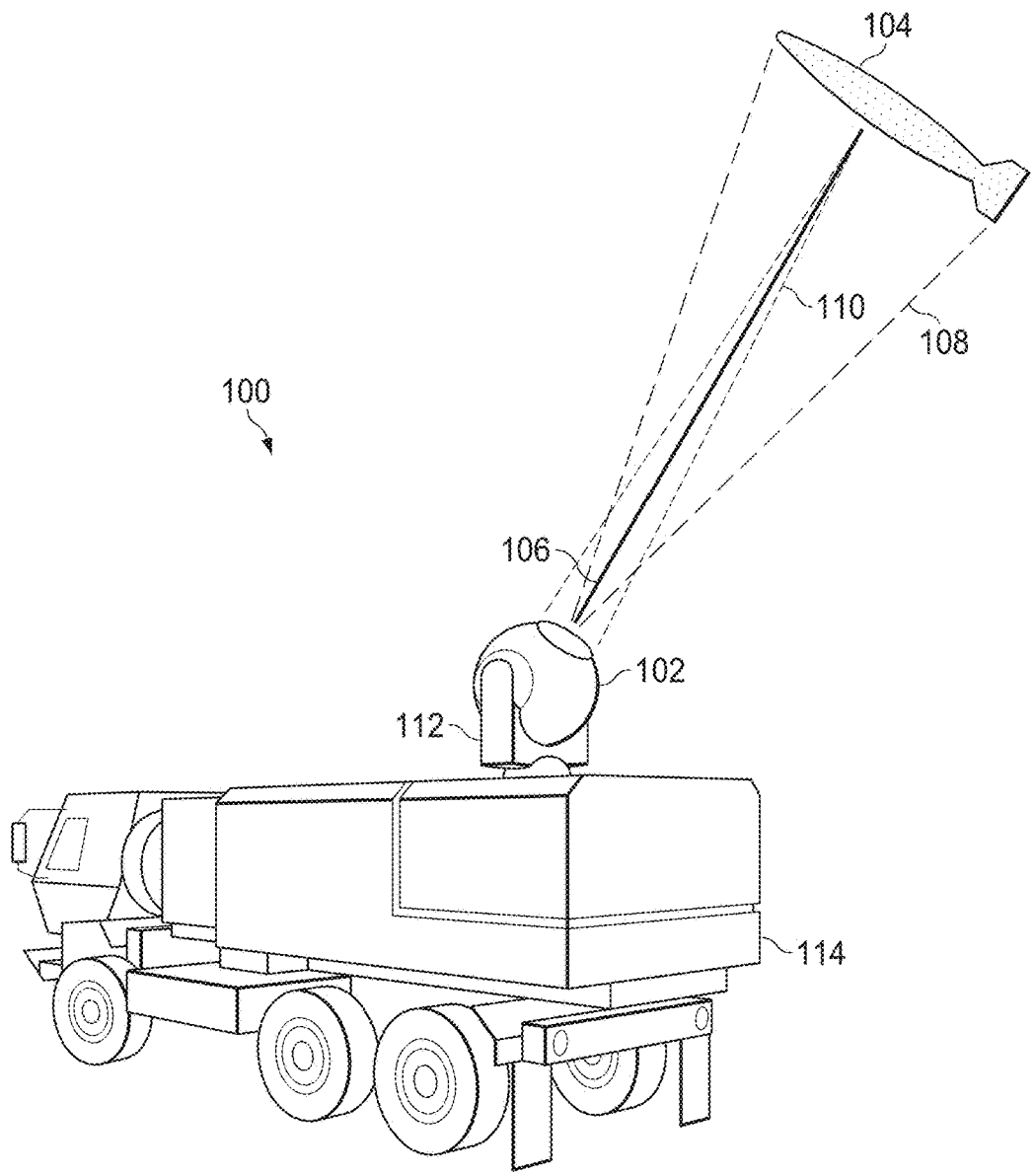
FIG. 1 illustrates an example system supporting atmospheric jitter correction and target tracking using a single imaging sensor for a high-energy laser according to this disclosure.

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that any features illustrated in the figures may be employed in any of the embodiments described. Omission of a feature or component from a particular figure is for purposes of simplicity and clarity and is not meant to imply that the feature or component cannot be employed in the embodiments described in connection with that figure.

As noted above, high-energy laser (HEL) systems are being developed for a number of commercial and defense-related applications, such as to direct high-energy beams at incoming missiles, rockets, mortars, or other targets. Unfortunately, various factors can degrade a high-energy laser beam or interfere with its use. For example, optical turbulence in the atmosphere or other factors can degrade the effects of a high-energy laser beam by distorting the beam's wavefront profile. Target dynamics, such as changes in direction or velocity of the target, can introduce tracking errors when pointing the high-energy laser beam at the target. Jitter of the high-energy laser beam can alter the location where the beam strikes the target, and the jitter going up in the atmosphere is different than the jitter going down in the atmosphere and is therefore difficult to identify based on measurements generated by a tracking sensor on the ground. Wavefront errors introduced into a high-energy beam are typically composed of multiple-order errors, such as when the first two wavefront distortions are tip and tilt of beam jitter and the other wavefront errors are lumped into a category of higher-order errors. Overall, these issues can reduce the focused power of a high-energy beam on a desired target. This can increase the amount of time needed to achieve a desired result, such as damage or destruction of the target, or can prevent the desired result from being achieved.

Some approaches illuminate a target using a target illumination laser (TIL), which generates TIL laser energy that is offset in optical frequency from a high-energy beam. TIL energy reflects off the target and is imaged by a camera subsystem that is boresighted to the high-energy beam. The reflected TIL energy shifts based on downlink atmospheric jitter (jitter going down in the atmosphere), residual line of sight (LOS) stabilization errors in an LOS stabilization system, and target dynamics (such as target maneuvers). High-speed camera images of the reflected TIL energy can be used by a tracking system to estimate boresight error, and a fast steering mirror can be used in a closed-loop manner to compensate for the boresight error. However, the imaging of the reflected TIL energy does not fully identify uplink atmospheric jitter (jitter going up in the atmosphere), leaving the uplink jitter of the high-energy beam mostly uncorrected.

Other approaches use a beacon illumination laser (BIL) that is co-boresighted with the high-energy beam to generate a laser spot (also called a "see spot") on a target, which can be used to perform higher-order corrections. For example, a wavefront sensor can estimate a wavefront error based on reflected BIL laser energy, and a deformable mirror can be used to help compensate for the wavefront error. However, wavefront sensors are non-imaging and can only sense a wavefront, while the reflected BIL energy from the target may scintillate and contain many other signal sources creating errors in sensing. In addition, alignment errors between a BIL return sensor and a tracking camera create additional errors, which increase beam jitter and increase the overall size, weight, and power (SWaP) of the laser system or an overall system that includes the laser system.

In accordance with this disclosure, a single camera or other imaging sensor is used for both atmospheric jitter correction and target tracking in a high-energy laser system. As described in more detail below, a single imaging sensor, such as a short-wave infrared (SWIR) camera or other sensor, is co-boresighted to an optical path of a high-energy laser beam. In addition to the high-energy laser beam transmitted towards a target, a target illumination laser and a beacon illumination laser respectively transmit TIL laser energy and BIL laser energy towards the target. In some embodiments, the target illumination laser represents a continuous wave (CW) SWIR laser, and the beacon illumination laser represents an SWIR laser.

The single imaging sensor receives both reflected TIL energy and reflected BIL energy from the target, as well as other illumination that reflects from the target towards the imaging sensor. The imaging sensor is configured to capture images of the reflected TIL energy and of the reflected BIL energy. The image capture is interleaved or otherwise multiplexed such that the imaging sensor captures some images where reflected TIL energy (but not reflected BIL energy) is present and some images where both reflected TIL energy and reflected BIL energy are present. As a particular example, acousto-optic modulation or pulsing of the beacon illumination laser (such as by turning the beacon illumination laser on and off) allows (i) some images to be captured where reflected TIL energy is present without reflected BIL energy and (ii) other images to be captured where reflected TIL energy and reflected BIL energy are present. The different images that are captured in this manner can be used to perform different functions, such as when the TIL-related images are used for target tracking and the TIL/BIL-related images are used for boresight correction (including atmospheric jitter correction).

The use of a single boresighted imaging sensor to capture reflected TIL energy and reflected BIL energy helps to reduce or eliminate optical alignment jitter or other optical static or dynamic alignment errors that can occur when using multiple cameras or other imaging subsystems. Moreover, the ability to multiplex image capture of the reflected TIL energy and the reflected BIL energy allows a single imaging sensor, boresighted to the high-energy beam, to capture these reflections in order to balance and reduce/minimize atmospheric uplink jitter, higher-order atmospheric distortions, and dynamic target tracking errors for high-energy beam pointing. For example, a modulation (on-off) frequency of the beacon illumination laser can be optimized for uplink tip-tilt suppression, higher-order wavefront error suppression, and dynamic target tracking precision performance, and the modulation can be synchronized with the frame time of the imaging sensor. As a particular example, in the case of a tactical laser used when looking up over the horizon, imaging of the reflected BIL energy can be multiplexed with imaging of the reflected TIL energy to obtain 750 Hz TIL imagery and 1,750 Hz BIL imagery. This functionality may help to achieve a tracking accuracy of one micro-radian (μrad) or less, as well as an uplink atmospheric jitter estimation and correction accuracy of one μrad or less (such as 0.3 μrad or less). In addition, the same multiplexed imaging sensor configuration can be used to help correct for higher-order wavefront errors, such as by using power-in-the-bucket techniques like stochastic parallel gradient descent.

In this way, systems can be used to more accurately identify atmospheric effects and other effects impacting a high-energy laser beam and its use and to compensate for those effects. This can be achieved by correcting for uplink jitter of the high-energy beam going up to a target due to atmospheric optical turbulence while still tracking target dynamics. This enables precision high-energy beam pointing with a compact optical system that substantially reduces tip and tilt in the uplink beam transmission. Overall, this can significantly increase the ability of a high-energy laser beam to reach an intended target consistently and with greater effect.

FIG. 1 illustrates an example system 100 supporting atmospheric jitter correction and target tracking using a single imaging sensor for a high-energy laser according to this disclosure. As shown in FIG. 1, the system 100 includes a high-energy laser system 102 that is being used to engage a target 104. The target 104 in this example represents a rocket or missile. However, the high-energy laser system 102 may be used with any other suitable targets, such as one or more targets on the ground, in the air, or in space.

The laser system 102 in this example generates an HEL beam 106, a TIL beam 108, and a BIL beam 110. The HEL beam 106 represents a beam of laser energy that typically has a high power or energy level, such as at least about 10 kilo-Watts (kW) of power. Often times, the HEL beam 106 is ideally focused to as small an area as possible on the target 104, which is done in order to achieve the maximum possible effect on the target 104. However, because of this, the HEL beam 106 is particularly susceptible to jitter or other non-consistent placement of the HEL beam 106 on the target 104.

The TIL beam 108 represents a beam of laser energy that spreads out to illuminate most or all of the target 104. By spreading the TIL beam 108 and making it wider than the target 104 (or at least wider than a relevant portion of the target 104), there may be less or no concern about atmospheric jitter affecting the TIL beam 108 reaching the target 104. The TIL beam 108 typically has a much lower power or energy level compared to the HEL beam 106. Reflections of the TIL beam 108 off the target 104 can be received at the laser system 102 and used to measure, for instance, the distance and angle of the target 104 relative to the laser system 102 or relative to a high-energy laser in the laser system 102. In some embodiments, the TIL beam 108 may represent a continuous wave 1567 nanometer (nm) laser beam, although other suitable longer or shorter wavelengths may be used for the TIL beam 108.

The BIL beam 110 represents a beam of laser energy that is used to generate a more focused illumination spot or "see spot" on the target 104. In some cases, a particular intended location on the target 104 to be illuminated by the BIL beam 110 may be selected. For example, it may be predetermined to illuminate a particular feature on the nose of the target 104. The BIL beam 110 can be subject to optical turbulence in the atmosphere or other effects that create uplink jitter or other boresight error for the BIL beam 110. Thus, the actual location of the see spot on the target 104 may vary from the intended or expected location of the see spot, and the difference between the actual and intended/expected locations of the see spot can be used to determine the uplink jitter or other boresight error. In some embodiments, the BIL beam 110 may represent a 1005 nm laser beam, although other suitable longer or shorter wavelengths may be used for the BIL beam 110. The wavelength of the BIL beam 110 can be close to the wavelength of the HEL beam 106.

The BIL beam 110 is offset (such as in angle) relative to the HEL beam 106 so that the BIL beam 110 and the HEL beam 106 strike the target 104 at different locations. However, both beams 106 and 110 travel from the laser system 102 to the target 104 in very close proximity to one another, and the actual distance between the strike points for the two beams 106 and 110 can be very small. Because of this, compensating for the uplink jitter or other boresight error associated with the BIL beam 110 will (ideally) also correct for the same uplink jitter or other boresight error associated with the HEL beam 106. If the wavelength of the BIL beam 110 is close to the wavelength of the HEL beam 106, the two beams 106 and 110 can experience approximately the same uplink jitter.

As described in more detail below, the laser system 102 uses a single camera or other imaging sensor to capture images of the target 104 as illuminated using the TIL beam 108 and images of the target 104 as illuminated using the TIL beam 108 and the BIL beam 110. Among other things, this helps to avoid alignment errors typically associated with the use of multiple cameras. This may be highly desirable since alignment errors, even small ones, may introduce jitter of a high-energy beam on the target 104, thereby reducing overall system performance. Moreover, this enables the laser system 102 to more effectively compensate for atmospheric uplink jitter, higher-order atmospheric distortions, and dynamic target tracking errors. As a result, the laser system 102 can engage in more effective or accurate beam pointing for the HEL beam 106.

In this particular example, the laser system 102 includes or is used with a multi-axis gimbal 112, which mounts the laser system 102 on a vehicle 114. The multi-axis gimbal 112 includes any suitable structure configured to point the laser system 102 in a desired direction. In some embodiments, the multi-axis gimbal 112 can rotate the laser system 102 about a vertical axis for azimuth control and about a horizontal axis for elevation control. However, any other suitable mechanisms for pointing the laser system 102 (such as about a single axis or multiple axes) may be used here. Also, in this particular example, the vehicle 114 on which the laser system 102 is mounted represents an armored land vehicle. However, the laser system 102 may be used with any other suitable type of vehicle (such as any other suitable land, air, or space vehicle), or the laser system 102 may be mounted to a fixed structure (such as a building).

Among other things, the functionality implemented within the laser system 102 as described below helps to reduce or minimize beam jitter or other movement of the HEL beam 106 on the target 104. The ability to maintain the HEL beam 106 at substantially the same position on the target 104, even during maneuvering of the target 104, can help increase the effectiveness of the laser system 102. For example, this can help to increase the effectiveness of the laser system 102 in causing damage to or destruction of the target 104, or this can help to increase the effectiveness of the laser system 102 in interfering with the normal operation of the target 104.

Although FIG. 1 illustrates one example of a system 100 supporting atmospheric jitter correction and target tracking using a single imaging sensor for a high-energy laser, various changes may be made to FIG. 1. For example, the laser system 102 may be used in any other suitable environment and for any other suitable purpose. Also, while shown here as being used to damage or destroy a moving hostile target 104, the laser system 102 can be used in any number of other ways depending on the application.

As noted above, there are various commercial and other non-defense-related applications for high-energy laser systems that may benefit from the approaches described in this patent document. For instance, in commercial mining applications like drilling, mining, or coring operations, a high-energy laser can be used to soften or weaken an earth bed prior to drilling, which may allow for fewer drill bit changes and extended lifetimes and reliabilities of drill bits. In remote laser welding, cutting, drilling, or heat treating operations like industrial or other automation settings, a high-energy laser can be used to allow for the processing of thicker materials at larger working distances from the laser system while minimizing the heat-affected zone and maintaining vertical or other cut lines. This helps to support welding or cutting operations where proximity to the weld or cut site is difficult or hazardous and helps to protect the laser system and possibly any human operators from smoke, debris, or other harmful materials. In construction and demolition operations like metal resurfacing or deslagging, paint removal, and industrial demolition operations, a high-energy laser can be used to ablate material much faster and safer compared to conventional operations. As a particular example of this functionality, a high-energy laser can be used to support demolition of nuclear reactors or other hazardous structures, such as by cutting through contaminated structures like contaminated concrete or nuclear containment vessels or reactors from long distances. This avoids the use of water jet cutting or other techniques (which creates contaminated water or other hazardous waste) and provides improved safety (since human operators can remain farther away from contaminated structures being demolished). A number of additional applications are possible, such as with a high-energy laser in power beaming applications (where a beam is targeted to photovoltaic cells of remote devices to be recharged) or hazardous material applications (where a beam is used to heat and decompose hazardous materials into less harmful or non-harmful materials).

Figure 2:
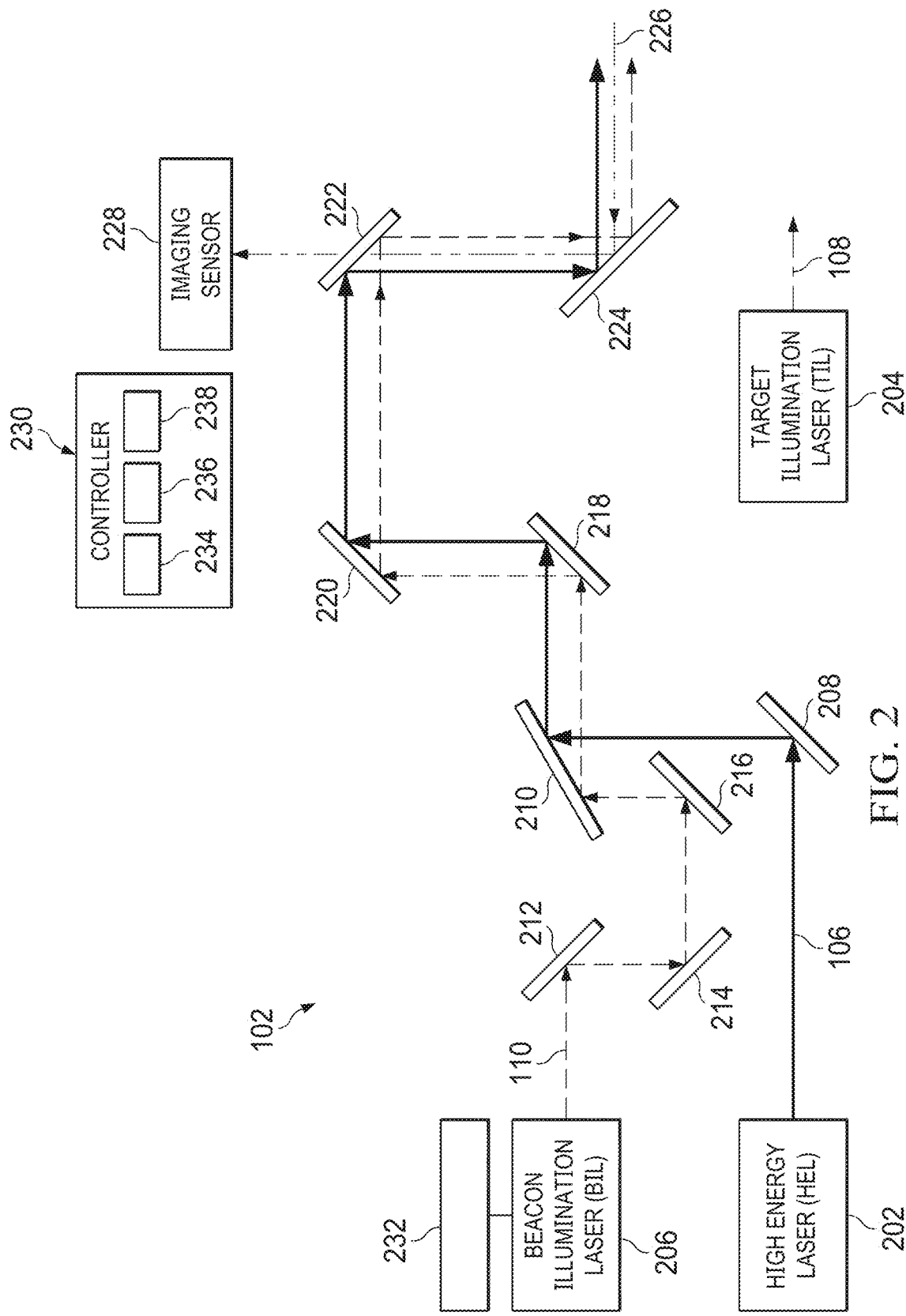
FIG. 2 illustrates an example high-energy laser system supporting atmospheric jitter correction and target tracking using a single imaging sensor according to this disclosure.

FIG. 2 illustrates an example high-energy laser system 102 supporting atmospheric jitter correction and target tracking using a single imaging sensor according to this disclosure. For ease of explanation, the high-energy laser system 102 shown in FIG. 2 may be described as being used in the system 100 of FIG. 1 to engage a hostile target 104. However, the high-energy laser system 102 of FIG. 2 may be used in any other suitable environment and for any other suitable purpose.

As shown in FIG. 2, the high-energy laser system 102 includes a high-energy laser 202, a target illumination laser 204, and a beacon illumination laser 206. As described above, the high-energy laser 202 is used to generate the HEL beam 106, the target illumination laser 204 is used to generate the TIL beam 108, and the beacon illumination laser 206 is used to generate the BIL beam 110. Each laser 202, 204, and 206 represents any suitable structure configured to generate the appropriate laser energy. In some embodiments, the high-energy laser 202 includes a planar waveguide (PWG) amplifier or other optical amplifier, which amplifies a seed laser beam using pump power provided to the optical amplifier by one or more pump sources (such as one or more laser diode arrays) to produce the HEL beam 106. However, any other suitable laser may be used here as the high-energy laser 202. Also, the target illumination laser 204 may represent a continuous wave 1567 nm laser, and the beacon illumination laser 206 may represent a 1005 nm laser. However, any other suitable lasers may be used here as the target illumination laser 204 and the beacon illumination laser 206.

In this example, the HEL beam 106 is transmitted towards a fold mirror 208, which redirects the HEL beam 106 towards a deformable mirror 210. The fold mirror 208 includes any suitable reflective structure configured to reflect one or more laser beams in a desired direction. The deformable mirror 210 includes at least one deformable reflective surface that can be used to alter a wavefront of the HEL beam 106 and optionally a wavefront of the BIL beam 110. This allows for pre-distortion of the wavefront of at least the HEL beam 106 prior to transmission towards the target 104, which helps to compensate for atmospheric wavefront errors. The actual pre-distortion provided by the deformable mirror 210 can be controlled based on wavefront errors sensed by an optional wavefront sensor, which is not shown in FIG. 2 for convenience. The deformable mirror 210 includes any suitable deformable reflective structure configured to reflect laser beams in a desired direction. In some embodiments, the deformable mirror 210 may represent a digital micro-mirror device (DMD), which may include numerous very small mirrors that can be repositioned or reoriented to provide the desired wavefront correction.

Two fast steering mirrors 212 and 214 and an additional fold mirror 216 are used to provide the BIL beam 110 from the beacon illumination laser 206 to the deformable mirror 210. Each of the fast steering mirrors 212 and 214 is configured to be repositioned, reoriented, or reshaped in order to generally align the BIL beam 110 with the HEL beam 106 as desired. The BIL beam 110 here can be dynamically offset but otherwise aligned with the HEL beam 106 using the fast steering mirrors 212 and 214. This enables the BIL beam 110 to be offset (such as in angle) relative to the HEL beam 106 but to still travel in substantially the same direction towards the target 104. The fold mirror 216 redirects the BIL beam 110 towards the deformable mirror 210. Each fast steering mirror 212 and 214 includes any suitable reflective structure configured to reflect one or more laser beams in a controllable direction, and each fast steering mirror 212 and 214 typically includes at least one servo for controlling how the one or more laser beams are directed. The fold mirror 216 includes any suitable reflective structure configured to reflect one or more laser beams in a desired direction.

Two additional fast steering mirrors 218 and 220 are used to redirect the HEL beam 106 and the BIL beam 110 through the optical assembly. Since these fast steering mirrors 218 and 220 are being used to transport the beams 106 and 110 generally along the polar axis of the laser system 102, the fast steering mirrors 218 and 220 may be referred to as Coudé Path fast steering mirrors. Each fast steering mirror 218 and 220 includes any suitable reflective structure configured to reflect laser beams in a controllable direction, and each fast steering mirror 218 and 220 typically includes at least one servo for controlling how the laser beams are directed.

An aperture sharing element 222 reflects the HEL beam 106 and the BIL beam 110 towards a high-speed mirror 224, which can be reoriented to provide tip and tilt compensation for the HEL beam 106 and the BIL beam 110. For example, the high-speed mirror 224 can be controlled using a fine tracking control loop that allows very small changes to be made very quickly to the orientation of the high-speed mirror 224. This can help to keep the HEL beam 106 and the BIL beam 110 at desired positions on the target 104 and reduce jitter caused by optical turbulence in the atmosphere or other boresight error. The high-speed mirror 224 includes any suitable reflective structure configured to reflect laser beams in a controllable direction, and the high-speed mirror 224 typically includes at least one servo for controlling how the laser beams are directed.

The high-speed mirror 224 also receives reflected laser energy 226 from the target 104 and redirects the reflected laser energy 226 towards the aperture sharing element 222, which passes the reflected laser energy 226 to an imaging sensor 228. The aperture sharing element 222 here can reflect or otherwise redirect the outgoing beams 106 and 108 towards the high-speed mirror 224 and transmit or otherwise allow passage of the reflected laser energy 226 from the high-speed mirror 224. This supports simultaneous transmission of the beams 106 and 108 towards the target 104 and reception of the reflected laser energy 226 from the target 104. The aperture sharing element 222 includes any suitable structure configured to redirect some laser energy and to allow passage of other laser energy, such as a dichroic mirror. Note that the reflected laser energy 226 here may not be redirected by the fast steering mirrors 212, 214, 218, and 220, which means the fast steering mirrors can be used to control the HEL beam 106 and the BIL beam 110 separate from any control used to provide the reflected laser energy 226 to the imaging sensor 228.

The imaging sensor 228 is co-boresighted with the HEL beam 106, and the imaging sensor 228 is configured to capture images of the target 104 and the reflected laser energy 226. The reflected laser energy 226 here can include reflected TIL energy and possibly reflected BIL energy (depending on the modulation state of the beacon illumination laser 206). The reflected laser energy 226 can also include any other illumination reflected from the target 104 towards the laser system 102, such as a reflected portion of the HEL beam 106. The imaging sensor 228 represents a camera or other suitable imager configured to capture images of a scene. In some embodiments, the imaging sensor 228 represents a high-speed SWIR camera. The images captured by the imaging sensor 228 include (i) images that contain reflected TIL energy without reflected BIL energy and (ii) images that contain both reflected TIL energy and reflected BIL energy.

The images captured by the imaging sensor 228 are provided to a controller 230, which controls the overall operation of the laser system 102 and possibly a larger system into which the laser system 102 is integrated. For example, the controller 230 can control the operation of the lasers 202, 204, and 206 and the operation of the imaging sensor 228. The controller 230 can also process the TIL-related images from the imaging sensor 228 to perform target tracking, and the controller 230 can process the TIL/BIL-related images from the imaging sensor 228 to perform atmospheric jitter correction and other boresight error correction. As particular examples, the controller 230 may process the images from the imaging sensor 228 to identify locations of the HEL beam 106 and the BIL beam 110 on the target 104 and adjust one or more of the fast steering mirrors 212, 214, 218, 220 or the high-speed mirror 224 to change how one or both of the HEL beam 106 and the BIL beam 110 are directed towards the target 104. This allows the controller 230 to maintain separation of the HEL beam 106 and the BIL beam 110 actually on the target 104. The controller 230 may further process the images from the imaging sensor 228 to identify atmospheric jitter or other boresight error and control the high-speed mirror 224 to help compensate for the jitter. In addition, the controller 230 may interact with an acoustic-optical modulator 232 or other mechanism used to modulate or pulse the operation of the beacon illumination laser 206 so that, at times, images containing reflected TIL energy without reflected BIL energy can be obtained by the imaging sensor 228 and processed by the controller 230. Of course, other mechanisms for modulating the BIL beam 110 (such as physically blocking or redirecting the BIL beam 110 away from the target 104) may be used.

As can be seen in this example, the fast steering mirrors 212 and 214 are disposed outside the common optical path traveled by the HEL beam 106 and the BIL beam 110, which extends between the deformable mirror 210 and the target 104. The fast steering mirrors 212 and 214 can therefore help to bias the BIL beam 110 from the HEL beam 106 so that the beams 106 and 110 strike the target 104 at different locations. Moreover, the fast steering mirrors 212 and 214 allow the path of the BIL beam 110 to be controlled independent of the adjustments made to both beams 106 and 110 by the fast steering mirrors 218 and 220.

As noted above, the operation of the beacon illumination laser 206 can be modulated or pulsed so that the imaging sensor 228 is able to generate both (i) images containing reflected TIL energy without reflected BIL energy and (ii) images containing reflected TIL energy and reflected BIL energy. To generate the first type of images, the TIL beam 108 can be sent towards the target 104, while the beacon illumination laser 206 is deactivated or is otherwise not sent towards the target 104. To generate the second type of images, the TIL beam 108 and the BIL beam 110 can be sent simultaneously towards the target 104.

A TIL-based tracking function of the controller 230 can process images of the target 104 containing reflected TIL energy but not reflected BIL energy. As a result, the tracking function can be used to help stabilize the HEL beam 106 and the laser system's line-of-sight on the target 104 using images captured by the imaging sensor 228 based on reflected TIL energy. The fast steering mirrors 218 and 220 can be used for target tracking and HEL beam pointing, which ensures that the BIL beam 110 (once generated or otherwise transmitted towards the target 104) will also be on the target 104. The actual location where the HEL beam 106 arrives at the target 104 is based on boresight error, which includes any atmospheric uplink tip-tilt or jitter.

When the beacon illumination laser 206 is activated or the BIL beam 110 is otherwise sent towards the target 104, images captured by the imaging sensor 228 include reflected TIL energy and reflected BIL energy. The reflected BIL energy identifies a see spot on the target 104 where the BIL beam 110 actually strikes the target 104. Any difference between the actual location of the BIL beam 110 on the target 104 and the intended/expected location of the BIL beam 110 on the target 104 can be treated by the controller 230 as the boresight error, which affects both the BIL beam 110 and the HEL beam 106. The see spot generated by the BIL beam 110, including its sidelobes, can be quite broad spatially at the target 104 at tactical ranges and can cover the target 104 and/or target-like features with high enough amplitude to generate one or more images that can be interpreted by the controller 230. The high-speed mirror 224 can then be used for things like atmospheric jitter correction, which helps to ensure that the HEL beam 106 remains at substantially the same location on the target 104.

In some embodiments, the controller 230 executes or performs an imaging tracking algorithm to estimate uplink motion of the see spot generated by the BIL beam 110 relative to one or more features on the target 104 (such as the nose of the target 104), which can be identified with morphological image processing of the captured images. Estimates of the motion of the see spot from frame to frame can be obtained, such as by correlating the expected area of the see spot location in one image with a reference image. The reference image may be a recursively-integrated, shift-corrected see spot image from prior frames. The controller 230 can also execute or perform a predictive estimation algorithm that uses spot motion estimates to predict uplink beam jitter on the target 104 when the HEL beam 106 arrives at the target 104. The prediction can be forward in time and can consider the round trip speed-of-light delay of the BIL beam 110 reaching the target 104 and returning, as well as any fast steering mirror servo delays, high-speed mirror servo delays, and processing delays. The controller 230 may then control one or both fast steering mirrors 218, 218 and/or the high-speed mirror 224 to compensate for predicted jitter, such as by causing the HEL beam 106 to move in the opposite direction as the predicted jitter. Ideally, this minimizes or eliminates atmospheric uplink jitter by the time the HEL beam 106 reaches the target 104.

The controller 230 includes any suitable structure configured to process images and control one or more operations of a laser system. For example, the controller 230 may include any suitable hardware or combination of hardware and software/firmware instructions for processing images and controlling one or more operations of a laser system, and the controller 230 may be programmable or dedicated.

In some embodiments, the controller 230 includes at least one processor 234, at least one memory 236, and at least one communication interface 238. The at least one processor 234 may be configured to execute instructions stored in and obtained from at least one memory 236. The at least one processor 234 may include any suitable number(s) and type(s) of processing devices or other computing or control devices in any suitable arrangement. As specific examples, the at least one processor 234 may include one or more microprocessors, microcontrollers, digital signal processors (DSPs), field programmable gate arrays (FPGAs), application specific integrated circuits (ASICS), or discrete circuitry. The at least one memory 236 may include any suitable number(s) and type(s) of data storage and retrieval devices, such as random access memory, read only memory, Flash memory, a hard drive, an optical drive, or other memory. The at least one communication interface 238 may include any suitable number(s) and type(s) of interfaces allowing communication with other components of the laser system 102 or a larger system, such as one or more wired or wireless interfaces. Note that while shown and described as having a single controller 230, the laser system 102 may include multiple controllers that are used to control different aspects of the laser system 102.

Note that in this example, the TIL beam 108 is directed towards the target 104 separate from the HEL beam 106 and the BIL beam 110, and the TIL beam 108 does not pass through the aperture sharing element 222 and is not reflected by the high-speed mirror 224. In fact, in this example, the TIL beam 108 does not share any part of its optical path with the HEL beam 106 and the BIL beam 110 inside the laser system 102. However, that need not be the case, and the TIL beam 108 may follow a common optical path through part of the laser system 102 as the HEL beam 106 and the BIL beam 110. Also, while not shown here for convenience, one or more mirrors (such as one or more fast steering mirrors) and other optical devices may be used to direct the TIL beam 108 towards the target 104.

Figure 3:
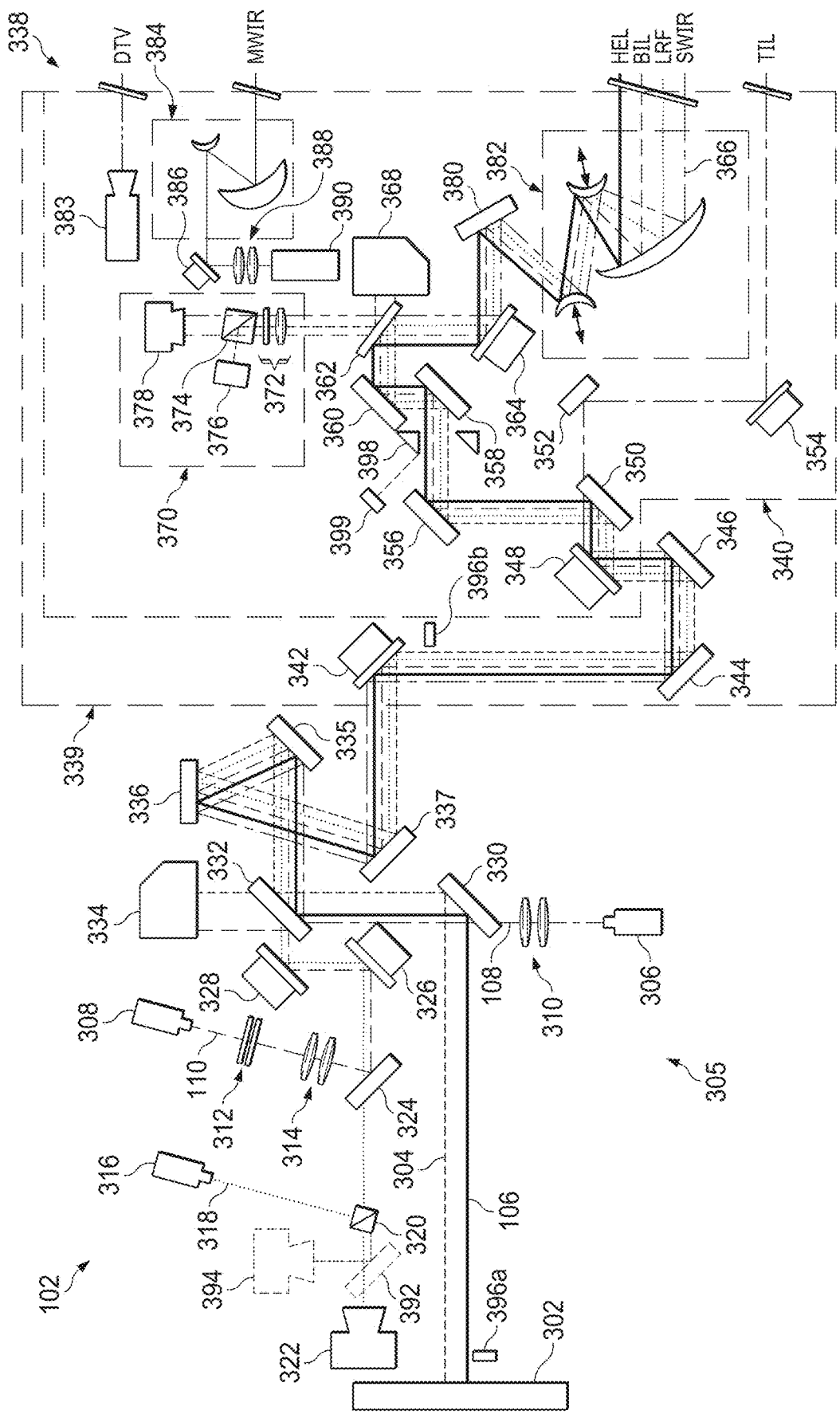
FIG. 3 illustrates another example high-energy laser system supporting atmospheric jitter correction and target tracking using a single imaging sensor according to this disclosure.

FIG. 3 illustrates another example high-energy laser system 102 supporting atmospheric jitter correction and target tracking using a single imaging sensor according to this disclosure. In particular, FIG. 3 illustrates a more detailed example implementation of the laser system 102 compared to FIG. 2. However, the laser system 102 shown in FIG. 3 operates in the same or similar manner as the laser system 102 shown in FIG. 2. For ease of explanation, the high-energy laser system 102 shown in FIG. 3 may be described as being used in the system 100 of FIG. 1 to engage a hostile target 104. However, the high-energy laser system 102 of FIG. 3 may be used in any other suitable environment and for any other suitable purpose.

As shown in FIG. 3, the laser system 102 includes a high-energy laser generator 302, which generates the HEL beam 106 and an auto-alignment (AA) beam 304. In some embodiments, the high-energy laser generator 302 includes one or more lasers that generate beams at different wavelengths and a spectral beam combining unit that combines the beams to produce a single overlapping beam, which here includes the HEL beam 106 and the AA beam 304. The AA beam 304 can be used internally within the laser system 102 for alignment purposes.

The laser system 102 also includes a laser alignment module (LAM) 305, which generally operates to produce additional laser beams and to align those additional beams with the HEL beam 106. In this example, a target illumination laser 306 (such as a 1567 nm laser) produces the TIL beam 108, and a beacon illumination laser 308 (such as a 1005 nm laser) produces the BIL beam 110. Variable divergence optics 310 can be used to alter the divergence of the TIL beam 108 in order to obtain a variable beam footprint for the TIL beam 108, which can help to ensure that the TIL beam 108 spreads over the entire target 104 or a desired portion of the target 104. A polarizer 312 can be used to set or alter the polarization of the BIL beam 110, and one or more beam expanders 314 can be used to increase the cross-sectional size of the BIL beam 110.

An additional laser 316 (such as a 1535 nm laser) is provided in the laser system 102 for laser range-finding. The range-finding laser 316 generates a range-finding beam 318, which is provided to a beam splitter 320. The beam splitter 320 divides the range-finding beam 318 into a first portion that is directed towards the target 104 and a second portion that is directed towards a range-finding receiver 322. The range-finding receiver 322 also senses part of the range-finding beam 318 that reflects off the target 104. Time-of-flight calculations, such as based on a time difference between reception of the second portion of the range-finding beam 318 from the beam splitter 320 and reception of the reflection at the receiver 322, or other calculations can be performed to estimate the distance to the target 104. Note, however, that the use of a laser range-finder is not required in the laser system 102.

A first dichroic mirror or other beam splitter/combiner 324 reflects the BIL beam 110 and transmits the first portion of the range-finding beam 318 towards a first fast steering mirror 326. The first fast steering mirror 326 and a second fast steering mirror 328 redirect the BIL beam 110 and the first portion of the range-finding beam 318. This can be done to help ensure that the BIL beam 110 is offset from the HEL beam 106 at the target 104. A second dichroic mirror or other beam splitter/combiner 330 reflects the HEL beam 106 and the AA beam 304 and transmits the TIL beam 108. A third dichroic mirror or other beam splitter/combiner 332 reflects the HEL beam 106, the AA beam 304, and the TIL beam 108 and transmits the BIL beam 110 and the range-finding beam 318. At this point, the various beams 106, 108, 110, 304, and 318 are generally aligned and follow a common optical path through part of the laser system 102. The third dichroic mirror or other beam splitter/combiner 332 also reflects a small portion of the BIL beam 110 and transmits a small portion of the AA beam 304 to a BIL/AA alignment sensor 334, which can sense the locations of the BIL beam 110 and the AA beam 304. This information can be used (such as by the controller 230, which is not shown in FIG. 3) to adjust one or both fast steering mirrors 326 and 328 in order to obtain a desired alignment and offset of the BIL beam 110 relative to the AA beam 304 (and therefore relative to the HEL beam 106).

Additional mirrors 335, 336, and 337 redirect the aligned beams 106, 108, 110, 304, and 318 as needed. In some embodiments, the mirrors 335, 336, and 337 may represent fold mirrors. In other embodiments, the mirrors 336 and 337 may represent fold mirrors, and the mirror 335 may represent an adaptive optic, such as a deformable mirror, used to correct for higher-order wavefront errors in at least the HEL beam 106 (and possibly in one or more of the other beams 108, 110, 304, and 318).

The laser system 102 further includes a beam director 338, which generally operates to direct the various beams 106, 108, 110, 304, and 318 towards the target 104. In this example, the beam director 338 includes an azimuth gimbal 339 and an elevation gimbal 340. The azimuth gimbal 339 may rotate various components (including the elevation gimbal 340) about a vertical axis for azimuth control, and the elevation gimbal 340 may rotate various components about a horizontal axis for elevation control.

The azimuth gimbal 339 in this example includes a fast steering mirror 342 and two fold mirrors 344 and 346, and the elevation gimbal 340 in this example includes a fast steering mirror 348. The fast steering mirrors 342 and 348 may represent Coudé Path fast steering mirrors, and the fold mirrors 344 and 346 may represent Coudé Path fold mirrors (since they are being used to transport the beams generally along the polar axis of the laser system 102). A first dichroic mirror or other beam splitter/combiner 350 is used to separate the TIL beam 108 from the other beams 106, 110, 304, and 318. The TIL beam 108 is redirected by a mirror 352 to a fast steering mirror 354, which can be adjusted (such as by the controller 230) in order to control how the TIL beam 108 is directed towards the target 104.

The other beams 106, 110, 304, and 318 are redirected using mirrors 356, 358, and 360 to a second dichroic mirror or other beam splitter/combiner 362. The second beam splitter/combiner 362 reflects the HEL beam 106, the BIL beam 110, and the range-finding beam 318 towards a fast steering mirror 364. The beam second splitter/combiner 362 also transmits incoming energy 366 (such as SWIR energy), where the incoming energy 366 may include reflections of the TIL beam 108 and the BIL beam 110. Further, the second beam splitter/combiner 362 may provide at least part of the AA beam 304 to an LOS/AA alignment sensor 368, which can sense the location of the AA beam 304. This information can be used (such as by the controller 230) to adjust one or more fast steering mirrors 342, 348, 354, and 364 to obtain a desired line-of-sight to the target 104. In addition, the second beam splitter/combiner 362 may provide a portion of the AA beam 304 and a portion of the BIL beam 110 to an imaging subsystem 370, which also receives the incoming energy 366.

The imaging subsystem 370 in this example includes optics 372, such as polarizers, lenses, or other components used to pre-process the portion of the AA beam 304, the portion of the BIL beam 110, and the incoming energy 366. A beam splitter 374 reflects the portion of the AA beam 304 to a position sensitivity detector 376 (such as a SWIR camera), which can detect the location of the AA beam 304. The beam splitter 374 also transmits the portion of the BIL beam 110 and the incoming energy 366 to an imaging sensor 378 (such as a Fourier transform spectrometer). Among other things, the imaging sensor 378 can capture images of the target 104, and the images can include reflected TIL energy and possibly reflected BIL energy (depending on the modulation of the beacon illumination laser 308 at the time of image capture).

The beams 106, 108, and 318 as reflected by the fast steering mirror 364 are reflected by a mirror 380 to a telescope 382. The mirror 380 may represent a fold mirror or an adaptive optic, such as a deformable mirror used for focus control. The mirror 380 also reflects the incoming energy 366, which is received by the telescope 382, towards the fast steering mirror 364. The telescope 382 directs the beams 106, 108, and 318 towards the target 104 and receives the incoming energy 366, which can include TIL, BIL, and other optical energy reflected from the target 104. In this example, the telescope 382 represents an afocal telescope having a large primary mirror and two smaller adjustable mirrors, although other types of telescopes may be used.

Various additional components may be used in the laser system 102 shown in FIG. 3. For example, a digital camera 383 may be used to capture visible images of a scene. A telescope 384 (such as an afocal telescope having a large primary mirror and a smaller adjustable mirror), a fast steering mirror 386, optics 388, and an infrared camera 390 (such as a mid-wave infrared or "MWIR" camera) may be used to capture infrared images of a scene. A dichroic mirror or other beam splitter/combiner 392 may be used to pass the second portion of the range-finding beam 318 to the range-finding receiver 322 while reflecting a portion of the BIL beam 110 (which is provided via the dichroic mirror or other beam splitter/combiner 324 and the beam splitter 320) to a wavefront sensor 394. One or more humidity sensors 396a-396b may be used to sense moisture within the laser system 102, which may be considered by the controller 230 when performing certain functions (such as determining how to adjust one or more fast steering mirrors). At least one safety scraper 398 can be used to absorb stray laser energy or redirect the stray laser energy to a beam dump or other location(s) for termination. At least one safety sensor 399 can be used to detect if stray laser energy presents a safety concern or other issue, which may allow the controller 230 to shut down the laser system 102, adjust one or more fast steering mirrors, or take other corrective action. Note, however, that one, some, or all of these features may be omitted.

As with the example shown in FIG. 2, the laser system 102 in FIG. 3 uses a single imaging sensor (the imaging sensor 378) to capture images that contain reflected TIL energy and images that contact reflected TIL energy and reflected BIL energy. Among other things, this allows the controller 230 to perform target tracking using the TIL-related images and to perform boresight correction (including jitter correction) using the TIL/BIL-related images. Also, the operation of the beacon illumination laser 308 can be modulated or pulsed as described above in order to facilitate the capture of these various images. As a result, the images can be used by the controller 230 to reduce or minimize atmospheric jitter, higher-order atmospheric distortions, and dynamic target tracking errors for very accurate high-energy beam pointing.

Although FIGS. 2 and 3 illustrate examples of high-energy laser systems 102 supporting atmospheric jitter correction and target tracking using a single imaging sensor, various changes may be made to FIGS. 2 and 3. For example, the makeup and arrangement of the laser systems 102 shown in FIGS. 2 and 3 are for illustration only, and components can be added, omitted, combined, further subdivided, replicated, or placed in any other suitable configuration according to particular needs. As a particular example, the arrangements of mirrors and other optical devices in FIGS. 2 and 3 to route different optical beams may be based on specific implementation needs, and other arrangements of mirrors and other optical devices may be used to direct optical beams in the desired manner. Also, the number(s) and type(s) of mirrors and other optical devices can vary based on the specific needs in a laser system. In general, this disclosure is not limited to any specific arrangement of mirrors and other optical devices. Further, note that any single feature or any combination of features shown in FIG. 3 but not in FIG. 2 may be added to the laser system 102 of FIG. 2 as needed or desired. In addition, note that any single feature or any combination of features shown in FIG. 3 but not in FIG. 2 may be omitted from the laser system 102 of FIG. 3 as needed or desired.

FIGS. 4 through 8 illustrate an example control system 400 supporting atmospheric jitter correction and target tracking using a single imaging sensor for a high-energy laser according to this disclosure. For ease of explanation, the control system 400 shown in FIGS. 4 through 8 may be described as being used with the high-energy laser system 102 of FIG. 2 or 3 in the system 100 of FIG. 1 to engage a hostile target 104. However, the control system may be used with any other suitable high-energy laser system in any other suitable environment and for any other suitable purpose.

Figure 4:
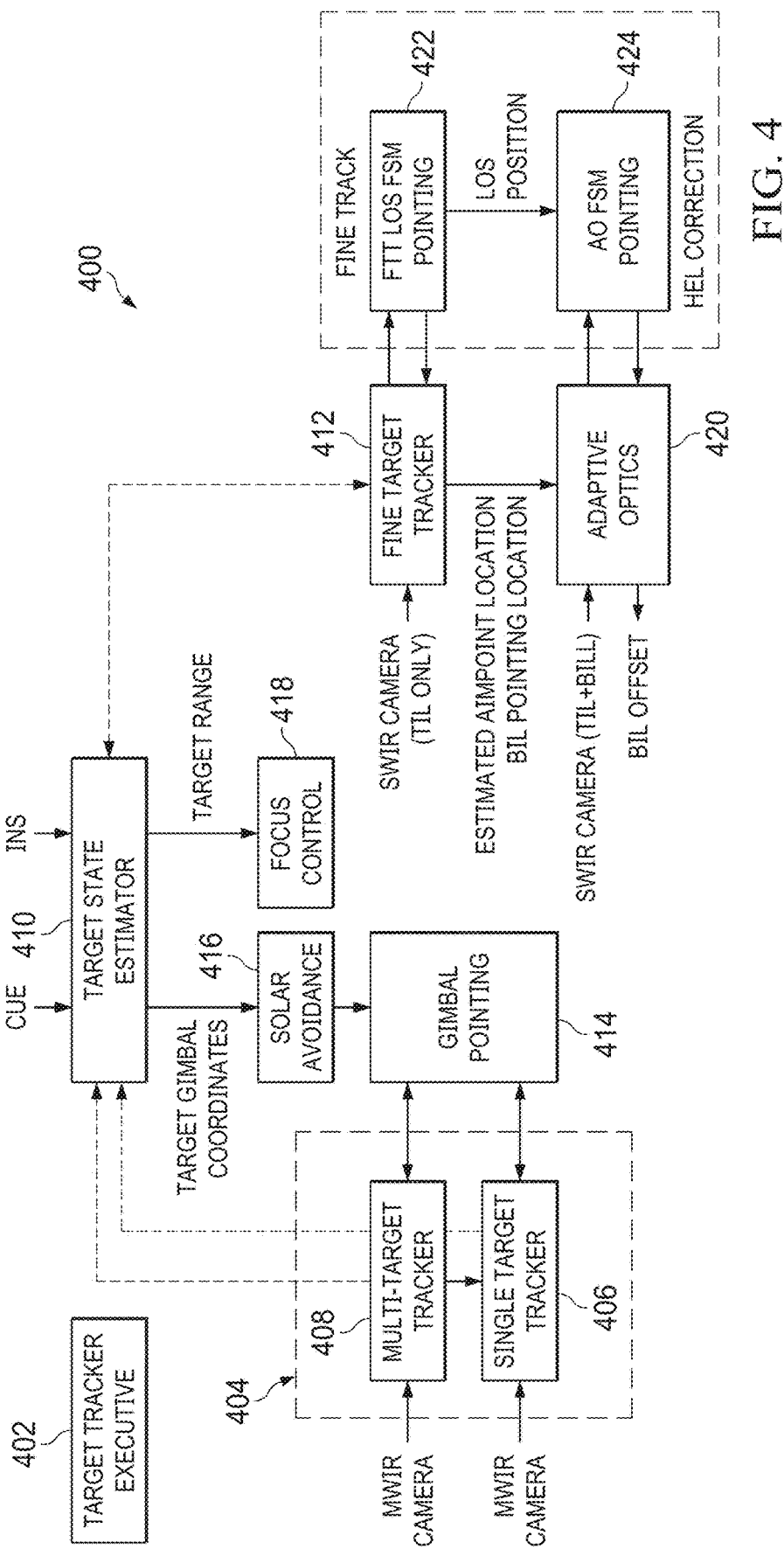

As shown in FIG. 4, the control system 400 includes a target tracker executive function 402, which generally operates to control the other functions of the control system 400. For example, the target tracker executive function 402 can control the tracking states, control modes, timing, and functions that are performed in the control system 400.

An acquisition and tracking controller (ATC) function 404 generally operates to identify and output coarse target tracks for one or more targets 104. In this example, the ATC function 404 includes a single target tracker function 406 and a multi-target tracker function 408. The single target tracker function 406 generally operates to identify small individual targets 104 in a field of view and output target positions, such as in pixel coordinates. In some embodiments, the single target tracker function 406 can identify the centroid of each target 104, correlate the movements of each target 104, and generate target state estimates and tracking errors for gimbal pointing. The single target tracker function 406 can also acquire targets 104 and reject false detections, such as by using kinematics-matching filters. In this example, the single target tracker function 406 receives input from an MWIR camera (such as the infrared camera 390), although other or additional input may be used here.

The multi-target tracker function 408 generally operates to identify multiple targets 104 in a field of view and output target positions, such as in pixel coordinates. In some embodiments, the multi-target tracker function 408 can identify the centroid of each target 104, correlate the movements of each target 104, and generate target state estimates and tracking errors for gimbal pointing. The multi-target tracker function 408 can also acquire targets 104 and reject false detections, such as by using kinematics-matching filters, and facilitate break-lock reacquisition. In this example, the multi-target tracker function 408 receives input from an MWIR camera (such as the infrared camera 390), although other or additional input may be used here.

A target state estimator (TSE) function 410 processes various information to determine current and predicted states of one or more identified targets 104. For example, the TSE function 410 can receive target locations from the ATC function 404 and can exchange additional target locations or other information with a fine target tracker (FTT) function 412. The TSE function 410 can also receive additional inputs, such as cues from other sensors and inputs from an inertial navigation system (INS). The TSE function 410 processes this or other information and generates inertial target state estimates for the identified targets 104, such as by using extended Kalman filter (EKF) tracking. The TSE function 410 can also engage in break-lock reacquisition. One or more filters can be used with the identified target locations to help filter out disturbances in the estimated locations. The TSE function 410 can further convert the determined target state estimates or other information into line-of-sight information, gimbal coordinates, and/or estimated ranges.

A gimbal pointing function 414 controls the direction in which a gimbal (such as the multi-axis gimbal 112 or the gimbals 339-340) is pointing a laser system 102. The gimbal pointing function 414 can use the target state estimates and tracking errors from the ATC function 404 and the gimbal coordinates from the TSE function 410 to determine where to point the laser system 102. In some embodiments, a solar avoidance function 416 can initially process the gimbal coordinates from the TSE function 410 in order to exclude potentially pointing the laser system 102 into or near the sun or other source of bright irradiance. A focus control function 418 controls the focus of the laser system 102 based on the estimated range to at least one target 104.

The FTT function 412 generally operates to provide line-of-sight stabilization for the laser system 102. For example, the FTT function 412 can track one or more centroids of one or more targets 104 (which can be used for HEL pointing), update target state estimates and tracking errors to the TSE function 410, and perform line-of-sight stabilization. The FTT function 412 also provides information identifying desired aimpoints of one or more laser beams (such as the HEL beam 106, TIL beam 108, and BIL beam 110) and a desired pointing location for the BIL beam 110. Adjustments to the locations of the HEL beam 106 and the BIL beam 110 on a specific target 104 can be controlled based on this information, such as by adjusting one or more of the fast steering mirrors 212, 214, 218, 220, 326, 328, 342, 348, 354, 364. In this example, the FTT function 412 receives input in the form of images containing reflected TIL energy without reflected BIL energy from an SWIR camera (such as the imaging sensor 228 or 378), although other suitable imaging sensors may be used here.

An adaptive optics (AO) function 420 generally operates to provide uplink tip-tilt correction and other boresight error correction. For example, the AO function 420 can identify a see spot location gradient (a difference in actual and expected/desired locations of a see spot generated by the BIL beam 110 on a target 104), identify the position of the HEL beam 106 (such as in in pixel coordinates) on the target 104, correlate the centroid position of the target 104, and generate tip-tilt corrections. The AO function 420 can also identify how the BIL beam 110 should be offset from the HEL beam 106 on a target 104. The corrections and offset can be controlled based on this information, such as by adjusting one or more of the fast steering mirrors 212, 214, 218, 220, 326, 328, 342, 348, 354, 364 and/or the high-speed mirror 224. Ideally, this stabilizes the BIL beam 110 on the target 104 and therefore stabilizes the HEL beam 106 at a desired aimpoint on the target 104. In this example, the AO function 420 receives input in the form of images containing reflected TIL energy and reflected BIL energy from an SWIR camera (such as the imaging sensor 228 or 378), although other suitable imaging sensors may be used here.

An FTT LOS fast steering mirror (FSM) pointing function 422 and an AO FSM pointing function 424 generally operate to adjust the optical devices in the laser system 102 to provide the desired adjustments to the HEL beam 106, the TIL beam 108, and the BIL beam 110. For example, the pointing functions 422 and 424 may cause adjustments to be made to any of the fast steering mirrors 212, 214, 218, 220, 326, 328, 342, 348, 354, 364 and/or the high-speed mirror 224. The pointing function 422 helps to achieve fine tracking changes in the line-of-sight for a target 104 by keeping the laser system 102 directed at the selected aimpoint on the target 104. The pointing function 424 helps to achieve fine HEL corrections in the position of the HEL beam 106 on the target 104.

Each of the functions 402-424 shown in FIG. 4 may be implemented in any suitable manner. For example, one, some, or all of the functions 402-424 may be implemented using dedicated hardware, such as at least one DSP, FPGA, or ASIC. As another example, one, some, or all of the functions 402-424 may be implemented using hardware with software/firmware instructions, such as at least one processor that executes software/firmware instructions. A combination of dedicated hardware and hardware with software/firmware can also be used. In general, the control system 400 is not limited to any specific configuration and can be implemented in any number of ways.

FIG. 5 illustrates an example TIL processing algorithm 500 that can be performed as part of the FTT function 412. As shown in FIG. 5, the TIL processing algorithm 500 receives input images 502 that contain reflected TIL energy but not reflected BIL energy. In this example, the images 502 are received at a specific rate (namely 750 Hz), although the images 502 can be received at any other suitable rate. Although not shown here, the images 502 may be pre-processed in any suitable manner, such as by performing initial clutter processing to enable easier target acquisition.

The images 502 are processed using an upsample function 504, which increases the amount of image data contained in the images 502. Any suitable technique can be used here to upsample the image data. Various techniques for upsampling data are known in the art, and other techniques are sure to be developed in the future. The upsampled images are processed using a subpixel correlation function 506, which aligns the upsampled images at the sub-pixel level. Any suitable technique can be used here to correlate the upsampled image data, such as map-based correlation. Various techniques for correlating image data are known in the art, and other techniques are sure to be developed in the future. The result is a set of aligned upsampled images.

A super resolution mapping function 508 processes the aligned upsampled images to generate one or more images having super-resolution, meaning a resolution higher than the original images 502. Various techniques for combining image data to produce super-resolution images are known in the art, and other techniques are sure to be developed in the future. The super-resolution images are processed using an edge segmentation function 510, which identifies edges or other features of at least one target 104 contained in the images. Various techniques for edge detection are known in the art, and other techniques are sure to be developed in the future. An aimpoint recognition function 512 uses this information to identify one or more selected aimpoints for one or more lasers on the at least one target 104. The aimpoint recognition function 512 can enable automatic selection of an aimpoint on a target 104, which may be based on various factors (such as the visible profile of the target 104 relative to the laser system 102). In some embodiments, the aimpoint recognition function 512 can select the aimpoint as the centroid of the target 104, where the centroid is based on the edges detected in one or more super-resolution images.

FIG. 6 illustrates an example BIL processing algorithm 600 that can be performed as part of the adaptive optics function 420. As shown in FIG. 6, the BIL processing algorithm 600 receives input images 602 that contain reflected TIL energy and reflected BIL energy, and these images 602 are multiplexed with the input images 502 (which are processed using the TIL processing algorithm 500). The multiplexing allows operations to be performed based on reflected BIL energy while still allowing the laser system 102 to maintain line-of-sight on a target 104 using target tracking based on the images 502. In this example, the images 602 are received at a specific rate (namely 1,750 Hz), although the images 602 can be received at any other suitable rate (which may or may not equal the rate of the images 502). Although not shown here, the images 602 may be pre-processed in any suitable manner.

The images 602 are provided to a target feature estimation function 604, which processes the images 602 to identify features of a target 104 and the BIL beam 110 on the target 104. For example, the target feature estimation function 604 can identify the top, bottom, and side edges of the target 104 and the location of the BIL beam 110 on the target 104. The top, bottom, and side edges of the target 104 can be determined in any suitable manner, such as based on movement of the target 104 over time. As described above, the location of the BIL beam 110 on the target 104 can vary based on a number of factors, including atmospheric uplink jitter and other boresight error. Various techniques for identifying target features are known in the art, and other techniques are sure to be developed in the future. The target feature estimation function 604 can also identify a desired offset of the BIL beam 110 from the HEL beam 106 on the target 104. The desired offset can be used to control the laser system 102, such as by adjusting one or more of the fast steering mirrors 212, 214, 326, 328.

A spot correlation window function 606 defines a window around the see spot formed by the BIL beam 110 on the target 104 in each image 602, and a correlation processing function 608 processes at least the windows of the images 602 to identify shifts of the see spot formed by the BIL beam 110 on the target 104. For example, the correlation processing function 608 can align the image data in the windows of the images 602 and then identify movements of the see spot on the target 104 in both x and y directions, which can be arbitrarily defined but which are typically orthogonal (although other coordinate systems may be used). A super resolution mapping function 610 processes at least the windows of the images 602 to generate one or more images or image portions having super-resolution, meaning a resolution higher than the original images 602. Various techniques for combining image data to produce super-resolution images are known in the art, and other techniques are sure to be developed in the future. The super-resolution images or image portions are processed by an automatic aimpoint function 612, which uses this information to detect the intended aimpoint for the BIL beam 110 on the target 104.

A prediction function 614 processes various information in order to predict the likely future jitter and other boresight error that will affect the BIL beam 110 over time. For example, the prediction function 614 can use the measured jitter and other boresight error of the BIL beam 110 during prior time periods to project forward what the boresight error will be in the future (for at least one or several future time periods, however large or small). The prediction function 614 can consider various factors in making the predictions, such as the round trip speed-of-light delay of the BIL beam 110 reaching the target 104 and returning, fast steering mirror servo delays, high-speed mirror servo delays, and processing delays. The predicted jitter and other predicted boresight error can be used to adjust one or more mirrors (such as one or more fast steering mirrors or a high-speed mirror) that direct the BIL beam 110 and the HEL beam 106 towards the target 104. Ideally, the adjustments alter at least one mirror to move the BIL beam 110 and the HEL beam 106 in the opposite direction as the predicted jitter or other boresight error, thereby helping to reduce or minimize movement of the BIL beam 110 and the HEL beam 106 on the target 104.

Each of the functions 504-512 and 602-614 shown in FIGS. 5 and 6 may be implemented in any suitable manner. For example, one, some, or all of the functions 504-512 and 602-614 may be implemented using dedicated hardware, such as at least one DSP, FPGA, or ASIC. As another example, one, some, or all of the functions 504-512 and 602-614 may be implemented using hardware with software/firmware, such as at least one processor that executes software/firmware instructions. A combination of dedicated hardware and hardware with software/firmware can also be used. In general, the processes 500 and 600 are not limited to any specific configuration and can be implemented in any number of ways.

Figure 7:
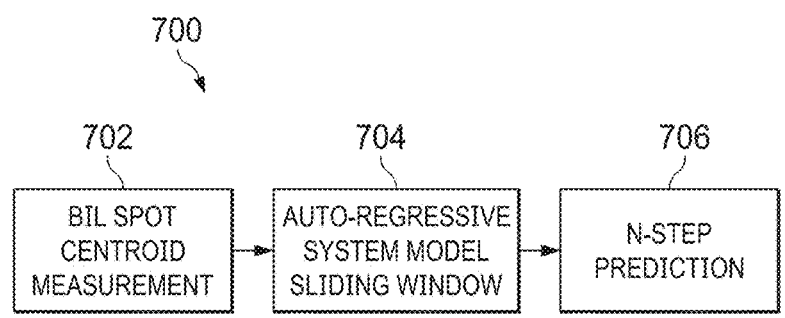

FIG. 7 illustrates an example process 700 that can be performed as part of the prediction function 614. As shown in FIG. 7, the process 700 includes a BIL spot centroid measurement function 702, which identifies the centroid of the see spot formed by the BIL beam 110 on the target 104 in the images 602 (or at least the windows of the images 602). In some embodiments, the centroids are calculated based on the top, bottom, and side edges of the target 104 detected earlier in the process 600.

An auto-regressive system model sliding window function 704 is used to estimate an autoregressive input-output model that characterizes uplink jitter and other boresight error. The model here is estimated based on motion of the see spot, which is based on changes in the centroid of the see spot over time. The model is estimated since there are typically no dynamical models of optical turbulence in the atmosphere, and an autoregressive input-output model can be used to suitably represent temporally-correlated atmospheric conditions. The autoregressive input-output model may be multi-pole, and the model's coefficients can be estimated on-line (such as by the controller 230). In some embodiments, the autoregressive input-output model can be estimated using least squares correlation estimation in a sliding window, and the model can be updated every time step or image. Note, however, that other types of models may be used to estimate atmospheric disturbances.

The model is used by an N-step prediction function 706 to predict the motion of the see spot generated by the BIL beam 110 on the target 104 for N future time periods (where N is an integer greater than or equal to one). For example, the N-step prediction function 706 can use the model and the prior measurements of the see spot's motion to make one or more predictions about how the see spot will move in the near future. Note that the accuracy of the predictions can be dependent on a number of factors, such as the number of future time periods and the sample rates of various data (including the see spot's motion).

Since atmospheric uplink jitter is typically band-limited to certain frequencies (typically below 250 Hz) and can have a $f^{8/3}$ temporal frequency roll-off, sampling the motion of the atmosphere at high speed enables accurate prediction out to many time steps (or images) in the future. When a single imaging sensor 228 or 378 is used for capturing both return TIL energy and return BIL energy, the TIL tracking and the BIL processing can be optimized to minimize total uplink jitter and to keep the BIL beam 110 pointed on the target 104. In some embodiments, the speed of the imaging sensor 228 or 378 for tactical ground-to-air scenarios may be approximately 2 kHz, while the target illumination laser 204 or 306 may operate at 500 Hz or less to maintain initial pointing accuracy. The high speed of the imaging sensor 228 or 378 can help to keep prediction errors small.

Figure 8:
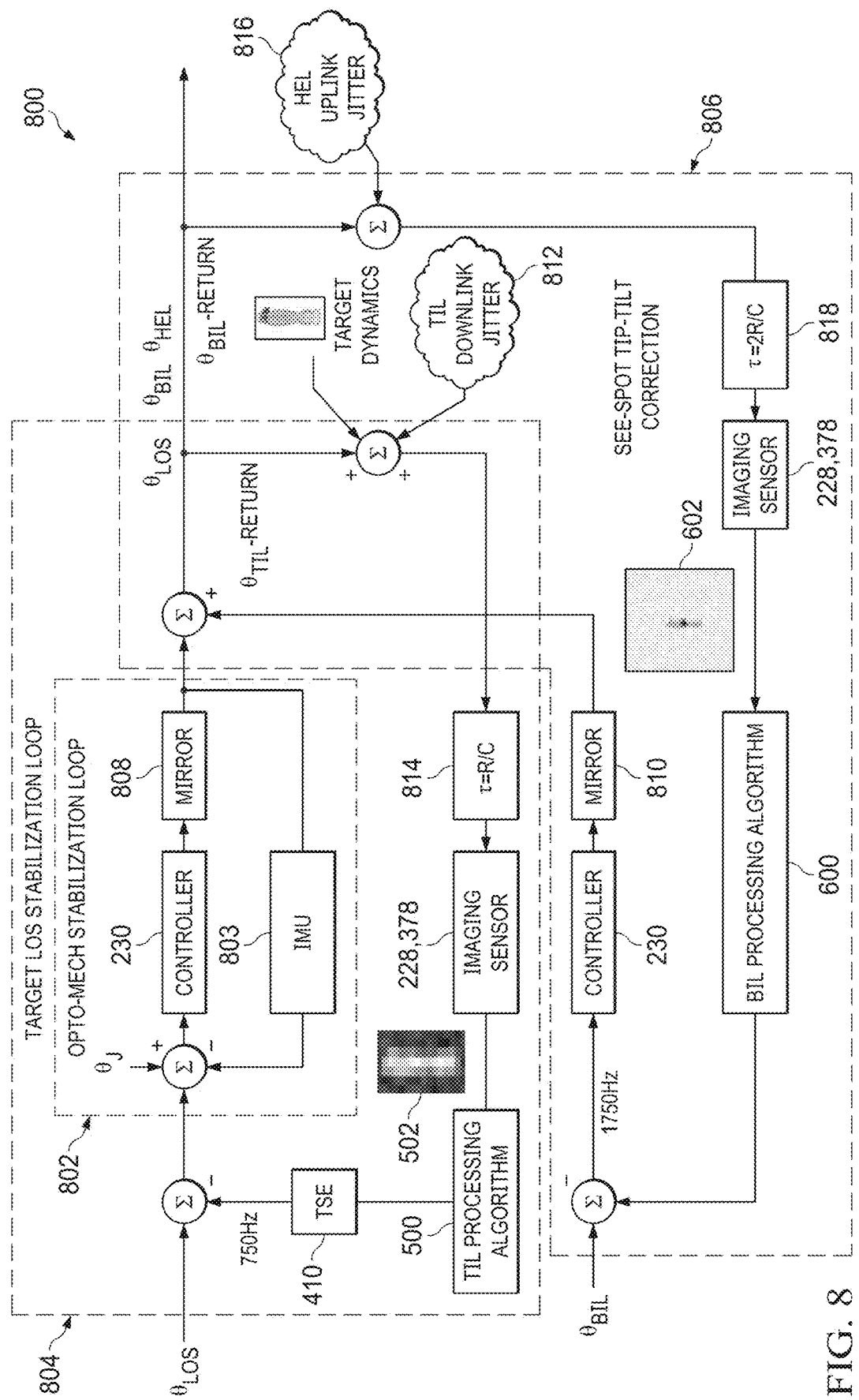

FIG. 8 illustrates an example control loop 800 that incorporates the TIL and BIL processing algorithms 500 and 600 and other functions discussed above. In some embodiments, the control loop 800 involves the use of the controller 230, which can perform control actions and execute the TIL and BIL processing algorithms 500 and 600 and other functions. However, as noted above, the use of a single controller 230 is not required, and the various operations of the control loop 800 can be performed using multiple controllers 230 and/or other components of the laser system 102.

As shown in FIG. 8, the control loop 800 includes three lower-level loops, including an opto-mechanical stabilization loop 802, a target LOS stabilization loop 804, and a tip-tilt correction loop 806. The function of the opto-mechanical stabilization loop 802 is to stabilize the pointing of a high-energy laser relative to the line-of-sight from movement caused by mechanical vibration of the overall system, such as platform vibration. This mechanical vibration (also referred to as mechanical jitter) is represented in FIG. 8 as $\theta_J$. In the opto-mechanical stabilization loop 802, the controller 230 receives the mechanical vibration $\theta_J$ and the line-of-sight of the imaging sensor 228 or 378, which is represented by $\theta_{LOS}$. The controller 230 operates to determine the compensation needed for correction of the mechanical vibration. Based on the determined compensation, the controller 230 controls at least one mirror 808 (such as at least one fast steering mirror 212, 214, 218, 220, 326, 328, 342, 348, 354, 364 and/or the high-speed mirror 224) to adjust the line-of-sight. An inertial measurement unit (IMU) 803, such as a fiber optic gyroscope, can be used here to measure forces acting on the laser system 102.

The target LOS stabilization loop 804 stabilizes the return off the target 104 from the target illumination laser 204, 306. A steering angle command to be applied to the target illumination laser 204, 306 is denoted $\theta_{TIL}$ in FIG. 8. The reflected TIL energy is affected by atmospheric downlink jitter 812, and the target LOS stabilization loop 804 senses the atmospheric downlink jitter 812 and compensates for the downlink jitter 812. A downlink time delay 814 is considered in the target LOS stabilization loop 804, where the downlink time delay 814 is a measure of the inherent speed-of-light time delay in the downlink for the TIL energy to reflect off the target 104 and be received at the imaging sensor 228 or 378. In the target LOS stabilization loop 804, the TIL processing algorithm 500 can be used to indicate where the TIL illumination from the target illumination laser 204 or 306 is aimed towards the target 104. The TSE function 410 can be updated based on the output of the TIL processing algorithm 500.

The tip-tilt correction loop 806 corrects for the effects of atmospheric uplink jitter on the BIL beam 110 and the HEL beam 106. A steering angle command to be applied to the beacon illumination laser 206, 308 is denoted $\theta_{BIL}$ in FIG. 8. In the tip-tilt correction loop 806, the controller 230 generates an input for an autoregressive model, and the input to the autoregressive model establishes where to point the BIL beam 110 to generate a see spot. Since the BIL beam 110 travels to the target 104, the BIL beam 110 is subject to atmospheric uplink jitter 816. The atmospheric uplink jitter 816 is reflected in movement of the see spot generated by the BIL beam 110 from an expected location to an actual location on the target 104. An uplink and downlink time delay 818 is considered in the tip-tilt correction loop 806, where the time delay 818 represents a measure of the inherent speed-of-light time delay in the uplink for the BIL beam 110 to reach the target 104 and return back to the imaging sensor 228 or 378. The BIL processing algorithm 600 receives the images 602 of the see spot from the imaging sensor 228 or 378 and predicts the uplink jitter of the BIL beam 110 (and therefore of the HEL beam 106) at a future point in time when the beams 106, 110 reach the target 104. The prediction results are used for jitter compensation, which includes movement of at least one mirror 810 (such as at least one fast steering mirror 212, 214, 218, 220, 326, 328, 342, 348, 354, 364 and/or the high-speed mirror 224). Note that the mirror(s) 808 used for LOS correction may or may not be the same mirror(s) 810 used for jitter correction.

Overall, the control loop 800 (including the target LOS stabilization loop 804 and the tip-tilt correction loop 806) can be used to mitigate all or substantially all disturbances and focus the HEL beam 106 on the desired target 104. This can significantly increase the effectiveness of the high-energy laser system 102 on the target 104. Consistent with what is described above, the target LOS stabilization loop 804 can operate at a slower rate than the tip-tilt correction loop 806. In the example shown in FIG. 8, the target LOS stabilization loop 804 operates at a frequency of 750 Hz, and the tip-tilt correction loop 806 operates at a frequency of 1,750 Hz. However, each loop 802, 804, and 806 may operate at any other suitable frequency.

Although FIGS. 4 through 8 illustrate one example of a control system 400 supporting atmospheric jitter correction and target tracking using a single imaging sensor for a high-energy laser, various changes may be made to FIGS. 4 through 8. For example, the approaches for using a single imaging sensor to support atmospheric jitter correction or other boresight error correction and target tracking as described in this patent document are not limited to use with the particular control system 400 shown in FIGS. 4 through 8.

Figure 9:
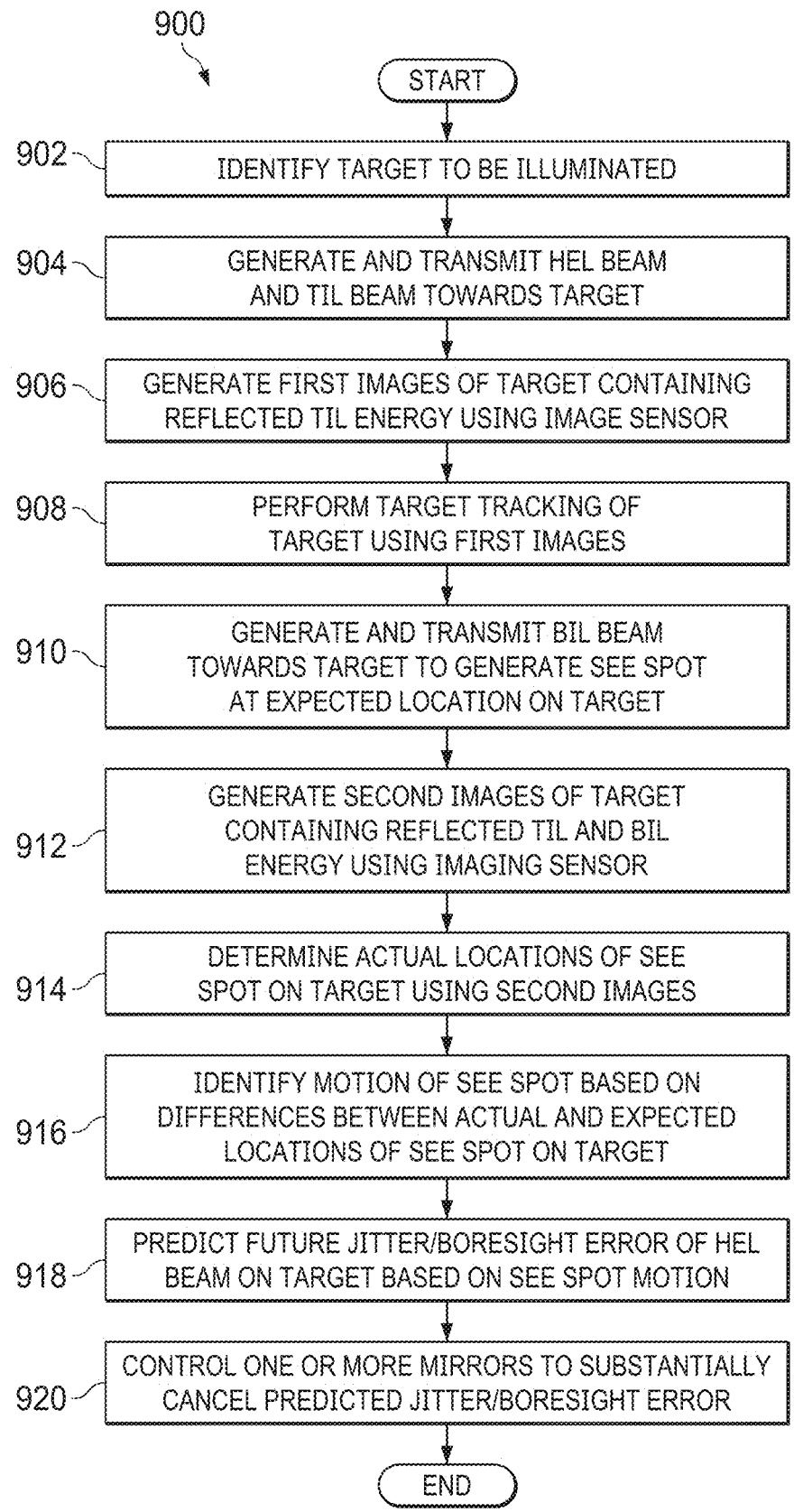
FIG. 9 illustrates an example method for atmospheric jitter correction and target tracking using a single imaging sensor in a high-energy laser system according to this disclosure.

FIG. 9 illustrates an example method 900 for atmospheric jitter correction and target tracking using a single imaging sensor in a high-energy laser system according to this disclosure. For ease of explanation, the method 900 shown in FIG. 9 may be described as involving the use of the high-energy laser system 102 of FIG. 2 or 3 in the system 100 of FIG. 1 to engage a hostile target 104. However, the method 900 may be used with any other suitable high-energy laser system in any other suitable environment and for any other suitable purpose.

As shown in FIG. 9, a target to be illuminated is identified at step 902. This may include, for example, the laser system 102 performing the ATC function 404 to identify a target 104 and a coarse track of the target 104. An HEL beam and a TIL beam are generated and transmitted towards the target at step 904. This may include, for example, the high-energy laser 202 or the high-energy laser generator 302 generating the HEL beam 106 and the target illumination laser 204 or 306 generating the TIL beam 108. This may also include the controller 230 controlling one or more fast steering mirrors 218, 220, 342, 348, 354, 364 and/or the high-speed mirror 224 to direct the beams 106 and 108 towards the target 104.

First images of the target containing reflected TIL energy are generated using an imaging sensor at step 906. This may include, for example, the imaging sensor 228 or 378 generating images 502 of the target 104 containing reflected TIL energy. The first images can be generated at a specific rate, such as 750 Hz or other rate. In some embodiments, the imaging sensor 228 or 378 is a high-speed SWIR camera or other imaging sensor that is co-boresighted with the HEL beam 106.

Target tracking is performed using the first images at step 908. This may include, for example, the laser system 102 performing the TIL processing algorithm 500 to process the images 502 and identify or update an aimpoint on the target 104 over time. This may also include the controller 230 controlling one or more fast steering mirrors 212, 214, 218, 220, 326, 328, 342, 348, 354, 364 and/or the high-speed mirror 224 to maintain the beams 106 and 108 on the target 104.

A BIL beam is generated and transmitted towards the target to generate a see spot on the target at an expected location at step 910. This may include, for example, the beacon illumination laser 206 or 308 generating the BIL beam 110. This may also include the controller 230 controlling one or more fast steering mirrors 212, 214, 326, 328 so that the BIL beam 110 has a desired offset from the HEL beam 106 on the target 104. This may further include the controller 230 controlling one or more fast steering mirrors 218, 220, 342, 348, 354, 364 and/or the high-speed mirror 224 to direct the BIL beam 110 (along with the beams 106 and 108) towards the target 104.

Second images of the target containing reflected TIL and BIL energy are generated using the same imaging sensor at step 912. This may include, for example, the imaging sensor 228 or 378 generating images 602 of the target 104 containing reflected TIL energy and reflected BIL energy. The second images can be generated at a specific rate, such as 1,750 Hz or other rate. Depending on the implementation, the HEL beam 106, TIL beam 108, and BIL beam 110 are at different wavelengths but are close enough in wavelength that they can be imaging using the same imaging sensor 228 or 378. The imaging sensor 228 or 378 generates the images 502 and 602 in an interleaved or other multiplexed manner.

Actual locations of the see spot on the target are identified at step 914 and used to identify motion of the see spot on the target at step 916. This may include, for example, the laser system 102 performing the BIL processing algorithm 600 to process the images 602, identify where the BIL beam 110 actually generates the see spot on the target 104, and identify changes in the position of the see spot on the target 104 over time. In some embodiments, the motion of the see spot can be estimated relative to one or more identified features on the target 104.

Future jitter or other boresight error of the HEL beam on the target is estimated based on the see spot motion at step 918. This may include, for example, the controller 230 predicting uplink jitter of the HEL beam 106 based on the see spot motion. In some embodiments, the uplink jitter is predicted by generating an autoregressive input-output model or other model of atmospheric turbulence and using the model to predict future jitter or other boresight error based on the identified prior motion of the see spot. The predictions can consider the round trip speed-of-light delay of the BIL beam 110 reaching the target 104 and returning, fast steering mirror servo delays, high-speed mirror servo delays, and processing delays. One or more mirrors are controlled to substantially cancel the predicted jitter or other boresight error at step 920. This may include, for example, the controller 230 controlling movement of one or more fast steering mirrors 212, 214, 218, 220, 326, 328, 342, 348, 354, 364 and/or the high-speed mirror 224 to move the HEL beam 106 and the BIL beam 110 in the opposite direction as the predicted jitter or other boresight error.

Although FIG. 9 illustrates one example of a method 900 for atmospheric jitter correction and target tracking using a single imaging sensor in a high-energy laser system, various changes may be made to FIG. 9. For example, while shown as a series of steps, various steps in FIG. 9 can overlap, occur in parallel, occur in a different order, or occur any number of times. As a particular example, the generation and use of the first images for target tracking can occur repeatedly, the generation and use of the second images for jitter or other boresight correction can occur repeatedly, and the generation and use of the first and second images can be multiplexed. Also, various steps can be combined or removed and additional steps can be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a target illumination laser (TIL) configured to generate a TIL beam that illuminates a target;
   a beacon illumination laser (BIL) configured to generate a modulated BIL beam that creates a pulsed spot on the target;
   an imaging sensor configured to (i) capture first images of the target at a first rate, the first images containing reflected TIL energy from the TIL beam without reflected BIL energy from the modulated BIL beam when the pulsed spot is not illuminated on the target and (ii) capture second images of the target at a second rate different from the first rate, the second images containing reflected TIL energy from the TIL beam and reflected BIL energy from the modulated BIL beam when the pulsed spot is illuminated on the target; and
   at least one controller configured to perform target tracking using the first images and boresight error compensation using the second images.

2. The system of claim 1, wherein, to perform the boresight error compensation, the at least one controller is configured to:
   determine actual locations of the pulsed spot on the target using the second images;
   identify motion of the pulsed spot on the target based on the actual locations;
   predict a future motion of the pulsed spot on the target based on the identified motion of the pulsed spot; and
   control one or more mirrors to substantially cancel the predicted future motion of the pulsed spot.

3. The system of claim 2, wherein:
   the system further comprises a high-energy laser (HEL) configured to generate an HEL beam that is directed towards the target; and
   the predicted future motion of the pulsed spot is used as a predicted future motion of the HEL beam such that substantially cancelling the predicted future motion of the pulsed spot also substantially cancels the predicted future motion of the HEL beam on the target.

4. The system of claim 3, wherein the at least one controller is further configured to control an offset of the modulated BIL beam relative to the HEL beam on the target.

5. The system of claim 4, wherein the at least one controller is configured to control the offset of the modulated BIL beam relative to the HEL beam independent of the boresight error compensation.

6. The system of claim 1, wherein, to perform the target tracking, the at least one controller is configured to:
   generate super-resolution images using the first images;
   identify one or more features of the target using the super-resolution images;
   automatically select an aimpoint on the target based on the one or more features; and control one or more mirrors to follow the selected aimpoint on the target.

7. The system of claim 1, wherein the at least one controller is further configured to modulate operation of the BIL so that the capture of the first images by the imaging sensor is multiplexed with the capture of the second images by the imaging sensor.

8. The system of claim 7, wherein the at least one controller is configured to modulate the operation of the BIL so that the imaging sensor captures the first images at the first rate and captures the second images at the second rate.

9. At least one non-transitory computer readable medium containing instructions that when executed cause at least one processor to:
control a target illumination laser (TIL) to generate a TIL beam that illuminates a target;
control a beacon illumination laser (BIL) to generate a modulated BIL beam that creates a pulsed spot on the target;
control an imaging sensor to (i) capture first images of the target at a first rate, the first images containing reflected TIL energy from the TIL beam without reflected BIL energy from the modulated BIL beam when the pulsed spot is not illuminated on the target and (ii) capture second images of the target at a second rate different from the first rate, the second images containing reflected TIL energy from the TIL beam and reflected BIL energy from the modulated BIL beam when the pulsed spot is illuminated on the target; and
perform target tracking using the first images and boresight error compensation using the second images.

10. The at least one non-transitory computer readable medium of claim 9, wherein the instructions that cause the at least one processor to perform the boresight error compensation comprise:
instructions that when executed cause the at least one processor to:
determine actual locations of the pulsed spot on the target using the second images;
identify motion of the pulsed spot on the target based on the actual locations;
predict a future motion of the pulsed spot on the target based on the identified motion of the pulsed spot; and
control one or more mirrors to substantially cancel the predicted future motion of the pulsed spot.

11. The at least one non-transitory computer readable medium of claim 10, further containing instructions that when executed cause the at least one processor to control a high-energy laser (HEL) that generates an HEL beam directed towards the target;
wherein the predicted future motion of the pulsed spot is used as a predicted future motion of the HEL beam such that substantially cancelling the predicted future motion of the pulsed spot also substantially cancels the predicted future motion of the HEL beam on the target.

12. The at least one non-transitory computer readable medium of claim 11, further containing instructions that when executed cause the at least one processor to control an offset of the modulated BIL beam relative to the HEL beam on the target.

13. The at least one non-transitory computer readable medium of claim 12, wherein the offset of the modulated BIL beam relative to the HEL beam is controllable independent of the boresight error compensation.

14. The at least one non-transitory computer readable medium of claim 9, wherein the instructions that cause the at least one processor to perform the target tracking comprise:
instructions that when executed cause the at least one processor to:
generate super-resolution images using the first images;
identify one or more features of the target using the super-resolution images;
automatically select an aimpoint on the target based on the one or more features; and
control one or more mirrors to follow the selected aimpoint on the target.

15. The at least one non-transitory computer readable medium of claim 9, further containing instructions that when executed cause the at least one processor to modulate operation of the BIL so that the capture of the first images by the imaging sensor is multiplexed with the capture of the second images by the imaging sensor.

16. A method comprising:
illuminating a target using a target illumination laser (TIL) beam;
creating a pulsed spot on the target using a modulated beacon illumination laser (BIL) beam;
using an imaging sensor, (i) capturing first images of the target at a first rate, the first images containing reflected TIL energy from the TIL beam without reflected BIL energy from the modulated BIL beam when the pulsed spot is not illuminated on the target and (ii) capturing second images of the target at a second rate different from the first rate, the second images containing reflected TIL energy from the TIL beam and reflected BIL energy from the modulated BIL beam when the pulsed spot is illuminated on the target; and
performing target tracking using the first images and boresight error compensation using the second images.

17. The method of claim 16, wherein performing the boresight error compensation comprises:
determining actual locations of the pulsed spot on the target using the second images;
identifying motion of the pulsed spot on the target based on the actual locations;
predicting a future motion of the pulsed spot on the target based on the identified motion of the pulsed spot; and
controlling one or more mirrors to substantially cancel the predicted future motion of the pulsed spot.

18. The method of claim 17, wherein:
the method further comprises directing a high-energy laser (HEL) beam towards the target; and
the predicted future motion of the pulsed spot is used as a predicted future motion of the HEL beam such that substantially cancelling the predicted future motion of the pulsed spot also substantially cancels the predicted future motion of the HEL beam on the target.

19. The method of claim 16, wherein performing the target tracking comprises:
generating super-resolution images using the first images;
identifying one or more features of the target using the super-resolution images;
automatically selecting an aimpoint on the target based on the one or more features; and
controlling one or more mirrors to follow the selected aimpoint on the target.

20. The method of claim 16, further comprising:
    modulating operation of the BIL so that the capture of the first images by the imaging sensor is multiplexed with the capture of the second images by the imaging sensor.

\* \* \* \* \*